US008187103B2

(12) United States Patent
Paulsen et al.

(10) Patent No.: US 8,187,103 B2
(45) Date of Patent: May 29, 2012

(54) GAMING METHOD AND APPARATUS UTILIZING SECONDARY SOFTWARE APPLICATIONS

(75) Inventors: Craig A. Paulsen, Reno, NV (US); Binh T. Nguyen, Reno, NV (US); Joseph R. Hedrick, Reno, NV (US)

(73) Assignee: IGT, Reno, NV (US)

( * ) Notice: Subject to any disclaimer, the term of this patent is extended or adjusted under 35 U.S.C. 154(b) by 10 days.

(21) Appl. No.: 12/898,967

(22) Filed: Oct. 6, 2010

(65) Prior Publication Data

US 2011/0070951 A1 Mar. 24, 2011

Related U.S. Application Data

(63) Continuation of application No. 10/930,296, filed on Aug. 31, 2004, now Pat. No. 7,828,656.

(51) Int. Cl.
*A63F 9/24* (2006.01)
*A63F 13/00* (2006.01)

(52) U.S. Cl. ................. 463/42; 463/36; 463/43; 463/47

(58) Field of Classification Search ................ 463/1, 29, 463/40, 42–43, 36, 47
See application file for complete search history.

(56) References Cited

U.S. PATENT DOCUMENTS 6,364,767 B1 4/2002 Brossard et al.
6,790,141 B2 9/2004 Muir
6,942,574 B1 9/2005 LeMay et al.
7,156,740 B2 * 1/2007 Kaminkow ..................... 463/31
7,201,657 B2 * 4/2007 Baerlocher et al. ............. 463/20
7,698,178 B2 * 4/2010 Chu ................................ 705/28
7,722,453 B2 * 5/2010 Lark et al. ........................ 463/16
2001/0036853 A1 * 11/2001 Thomas .......................... 463/17
2002/0090987 A1 * 7/2002 Walker et al. .................. 463/16
2002/0116284 A1 8/2002 Steelman et al.
2002/0142846 A1 10/2002 Paulsen (Continued)

FOREIGN PATENT DOCUMENTS

WO 03/088161 10/2003

(Continued)

OTHER PUBLICATIONS

International Preliminary Report on Patentability dated Feb. 28, 2007 from Application No. PCT/US2005/030641.

(Continued)

*Primary Examiner* — Steven J Hylinski
(74) *Attorney, Agent, or Firm* — Weaver Austin Villeneuve & Sampson LLP

(57) ABSTRACT

In a gaming method for facilitating game play via a gaming apparatus, the gaming apparatus comprising a controller and a first display unit, the controller communicatively coupled to the first display unit, a game software application may be executed, and value input data may be received. The first display unit may be caused to display a game image representative of one of the following games: poker, blackjack, slots, keno, or bingo. A secondary software application may be executed, and an icon associated with the secondary software application may be displayed simultaneous with the display of the game image, wherein a foreground of the game image is substantially unobstructed by the icon, and wherein the icon is substantially unobstructed by the foreground of the game image. Information may be conveyed using the secondary software application upon detecting an event, and a value payout associated with an outcome of the game may be determined.

47 Claims, 18 Drawing Sheets

U.S. PATENT DOCUMENTS

| | | | | |
|---|---|---|---|---|
| 2003/0060258 | A1* | 3/2003 | Coleman et al. | 463/16 |
| 2003/0064797 | A1* | 4/2003 | Jackson et al. | 463/25 |
| 2003/0064800 | A1* | 4/2003 | Jackson et al. | 463/30 |
| 2003/0064808 | A1* | 4/2003 | Hecht et al. | 463/42 |
| 2003/0069074 | A1* | 4/2003 | Jackson | 463/43 |
| 2003/0073499 | A1* | 4/2003 | Reece | 463/42 |
| 2003/0078088 | A1* | 4/2003 | Schneider | 463/16 |
| 2003/0125107 | A1* | 7/2003 | Cannon | 463/25 |
| 2004/0029636 | A1 | 2/2004 | Wells | |
| 2004/0048646 | A1* | 3/2004 | Visocnik | 463/16 |
| 2004/0087370 | A1* | 5/2004 | Tarantino | 463/42 |
| 2004/0127284 | A1* | 7/2004 | Walker et al. | 463/30 |
| 2004/0192438 | A1 | 9/2004 | Wells et al. | |
| 2005/0096125 | A1* | 5/2005 | LeMay et al. | 463/25 |
| 2005/0215311 | A1* | 9/2005 | Hornik et al. | 463/20 |
| 2005/0227769 | A1 | 10/2005 | Morrow et al. | |
| 2005/0227771 | A1* | 10/2005 | Nelson et al. | 463/43 |
| 2005/0282607 | A1* | 12/2005 | Gauselmann | 463/16 |
| 2005/0282614 | A1* | 12/2005 | Gauselmann | 463/20 |
| 2006/0003835 | A1 | 1/2006 | Olive | |
| 2006/0025215 | A1* | 2/2006 | Thomas | 463/30 |
| 2006/0046827 | A1* | 3/2006 | Saffari et al. | 463/19 |
| 2006/0073887 | A1* | 4/2006 | Nguyen et al. | 463/27 |
| 2006/0080175 | A1* | 4/2006 | Rowe et al. | 705/14 |
| 2006/0111168 | A1* | 5/2006 | Nguyen et al. | 463/16 |
| 2006/0135241 | A1* | 6/2006 | Wolf et al. | 463/16 |
| 2006/0148551 | A1* | 7/2006 | Walker et al. | 463/16 |
| 2006/0160620 | A1* | 7/2006 | Matthews et al. | 463/42 |
| 2006/0183538 | A1* | 8/2006 | Michaelson et al. | 463/27 |
| 2006/0194633 | A1* | 8/2006 | Paulsen | 463/43 |
| 2006/0211478 | A1* | 9/2006 | Walker et al. | 463/16 |
| 2006/0226597 | A1* | 10/2006 | Walker et al. | 273/138.1 |
| 2006/0258455 | A1* | 11/2006 | Kando | 463/36 |
| 2007/0004506 | A1* | 1/2007 | Kinsley et al. | 463/29 |
| 2007/0060319 | A1* | 3/2007 | Block et al. | 463/27 |
| 2007/0077997 | A1* | 4/2007 | Johnson | 463/42 |

FOREIGN PATENT DOCUMENTS

| | | |
|---|---|---|
| WO | 2006/026543 | 3/2006 |

OTHER PUBLICATIONS

Walter S. Mossberg, "Baby, It's Cold Outside—My Computer Told Me So," The Mossberg Solution, Personal Technology from the Wall Street Journal, published Mar. 12, 2003, http://ptech.wsj.com/achive/print-solution-20030312.html, printed Jun. 28, 2005, 3 pages.

Search Gambling Magazine, "Strategies for Responsible Gambling Outlined," http://www.gambligmagazine.com/managearticle.asp/c, printed Sep. 22, 2003, 4 pages.

International Search Report and Written Opinion dated Jan. 3, 2006, from Application No. PCT/US2005/030641.

US Office Action dated Jul. 16, 2007, from U.S. Appl. No. 10/930,296.

US Final Office Action dated Oct. 26, 2007, from U.S. Appl. No. 10/930,296.

US Advisory Action dated Jan. 28, 2008, from U.S. Appl. No. 10/930,296.

US Office Action dated Feb. 7, 2008, from U.S. Appl. No. 10/930,296.

US Office Action dated May 7, 2008, from U.S. Appl. No. 10/930,296.

US Final Office Action dated Jun. 20, 2008, from U.S. Appl. No. 10/930,296.

US Final Office Action dated Dec. 5, 2008, from U.S. Appl. No. 10/930,296.

US Advisory Action dated Feb. 27, 2009, from U.S. Appl. No. 10/930,296.

US Final Office Action dated Apr. 23, 2009, from U.S. Appl. No. 10/930,296.

US Office Action dated Jun. 23, 2009, from U.S. Appl. No. 10/930,296.

Examiner Interview Summary dated Aug. 13, 2009, from U.S. Appl. No. 10/930,296.

US Final Office Action dated Mar. 15, 2010, from U.S. Appl. No. 10/930,296.

US Notice of Allowance dated Jul. 6, 2010, from U.S. Appl. No. 10/930,296.

* cited by examiner

GAMING METHOD AND APPARATUS UTILIZING SECONDARY SOFTWARE APPLICATIONS

CROSS REFERENCE TO RELATED APPLICATIONS

This application claims priority under 35 U.S.C. §120 and is a continuation of co-pending U.S. patent application Ser. No. 10/930,296, filed Aug. 31, 2004, titled "GAMING METHOD AND APPARATUS UTILIZING SECONDARY SOFTWARE APPLICATIONS", which is hereby incorporated by reference in its entirety.

BACKGROUND

The present disclosure is generally related to gaming methods and apparatus, and in particular to user interfaces for gaming apparatus.

A typical game machine may include a controller having a processor and a memory, and the controller may be programmed to implement a game software routine. The game software routine will provide a user interface via which a player can interact with the game machine to play a game. Also, many game machines are connected to a data network and can exchange data with other computing devices via the data network.

With current game machines, a player typically cannot configure the user interface of the game machine to, for example, convey information of the player's choosing. Also, the player typically cannot configure the game machine to obtain information of the player's choosing via the data network. Rather, the user interface and the information that the player can access via the data network are essentially static from the point of view of the player.

Software programs for personal computers have been developed that permit a user to modify the "desktop" of their computer to retrieve and convey information related to, for example, news and weather. For example, a weather information program may receive weather information via the Internet and then display the information in a window and/or in a toolbar of the desktop. These software programs typically can be downloaded via the Internet and installed on the personal computer by the user. Once installed, the desktop of the personal computer is typically configured so that the desktop displays information (e.g., weather information) in a window and/or in a toolbar of the desktop.

SUMMARY

In one aspect, the invention is directed to a gaming method for facilitating game play via a gaming apparatus, the gaming apparatus comprising a controller and a first display unit, the controller communicatively coupled to the first display unit. The method may comprise executing a game software application, and receiving value input data. The method also may comprise causing the first display unit to display a game image representative of one of the following games: poker, blackjack, slots, keno, or bingo. The method additionally may comprise executing a secondary software application, and displaying an icon associated with the secondary software application simultaneous with the display of the game image, wherein a foreground of the game image is substantially unobstructed by the icon, and wherein the icon is substantially unobstructed by the foreground of the game image. The method may further comprise conveying information using the secondary software application upon detecting an event, and determining a value payout associated with an outcome of the game.

In another aspect, the invention is directed to a gaming apparatus. The gaming apparatus may include a first display unit, and a value input device. The gaming apparatus may additionally include a controller operatively coupled to the first display unit and the value input device, the controller comprising a processor and a memory operatively coupled to the processor. The controller may be programmed to execute a game software application, and to cause the first display unit to generate a game display relating to one of the following games: poker, blackjack, slots, keno or bingo. The controller also may be programmed to execute a secondary software application, and to cause an icon associated with the secondary software application to be displayed simultaneously with the game display, wherein a foreground of the game display is substantially unobstructed by the icon, and wherein the icon is substantially unobstructed by the foreground of the game display. The controller may further be programmed to convey information using the secondary software application upon detecting an event, and to determine a value payout associated with an outcome of the game.

In yet another aspect, the invention is directed to another gaming method for facilitating game play via a gaming apparatus, the gaming apparatus comprising a controller and a display unit, the controller communicatively coupled to the first display unit. The method may comprise executing a game software application, and receiving value input data. Also, the method may comprise causing the display unit to display a game image representative of one of the following games: poker, blackjack, slots, keno, or bingo. Additionally, the method may comprise prompting a person to select a secondary software application from a plurality of possible secondary software applications, and receiving selection data. Further, the method may comprise loading the selected secondary software application in response to the selection data, and executing the selected secondary software application. Still further, the method may comprise causing the display unit to display a toolbar simultaneous with the display of the game image, wherein a foreground of the game image is substantially unobstructed by the toolbar, and wherein the toolbar is substantially unobstructed by the foreground of the game image, wherein the toolbar includes an icon associated with the selected secondary software application. Additionally, the method may comprise conveying information using the selected secondary software application upon detecting an event, and determining a value payout associated with an outcome of the game.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
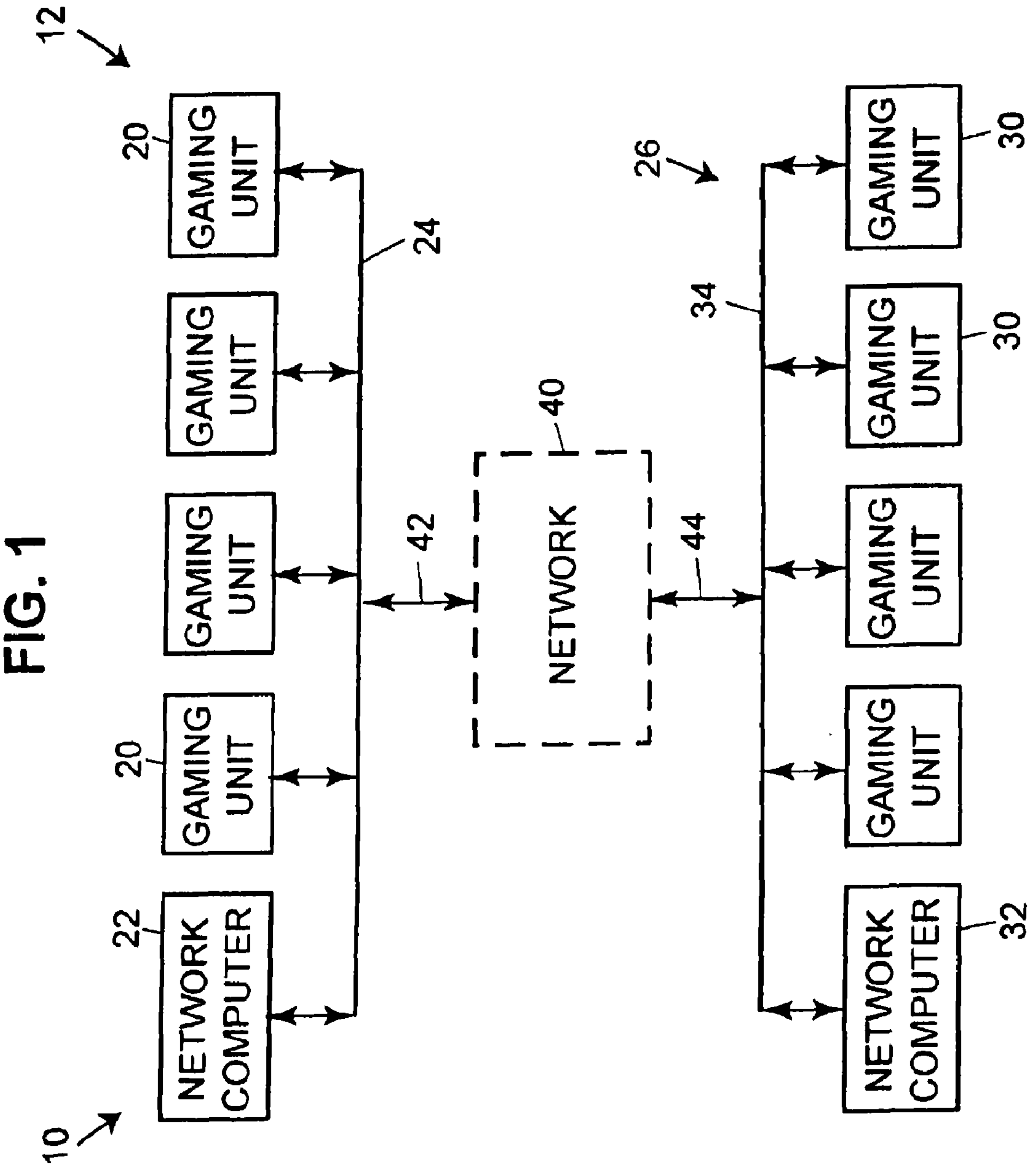
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link.

Although the data link 24 is shown as a single data link 24, the data link 24 may comprise multiple data links.

Figure 2:
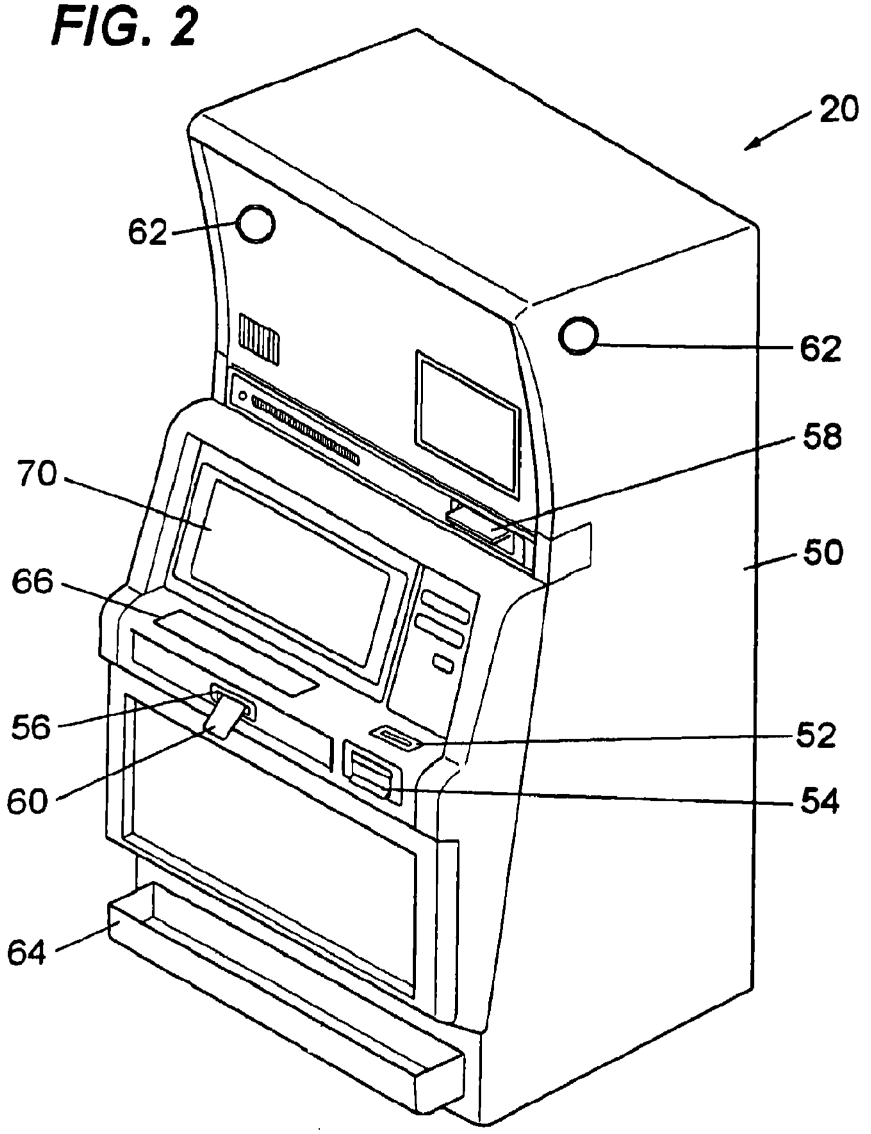
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader and/or writer (card reader/writer) 58, which may be used, for example, to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader, an optical card reader, a memory card reader, and may be used to read data from a card offered by a player, such as a credit card, a player tracking card, a smart card, a memory card, etc. Also, the card reader 58 may include any type of device for reading data from a portable memory device such as a smart card, a memory card, a memory cartridge, a memory stick, etc. If provided for player tracking purposes, the card reader 58 may be used to read data from, and/or write data to, player tracking cards that are capable of storing data representing the identity of a player, the identity of a casino, the player's gaming habits, etc. The card reader 58 may also be used to read software programs stored on a portable memory device and to be executed by the gaming unit 20.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
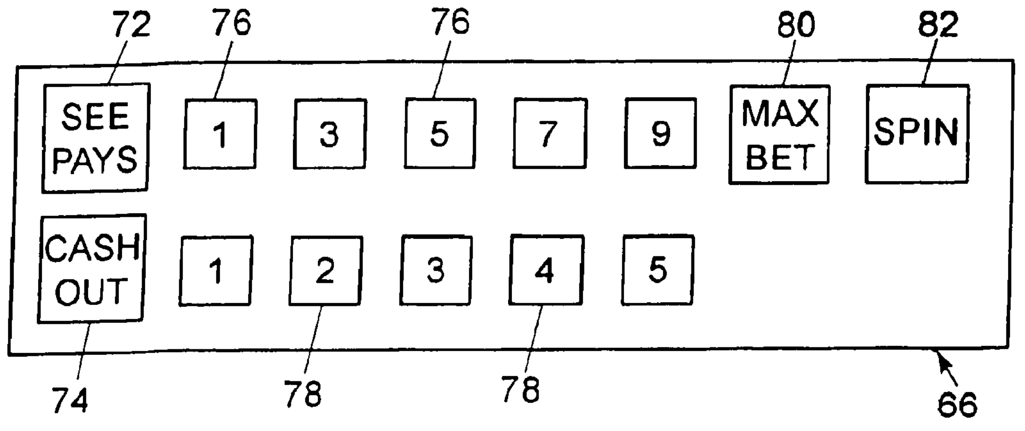
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
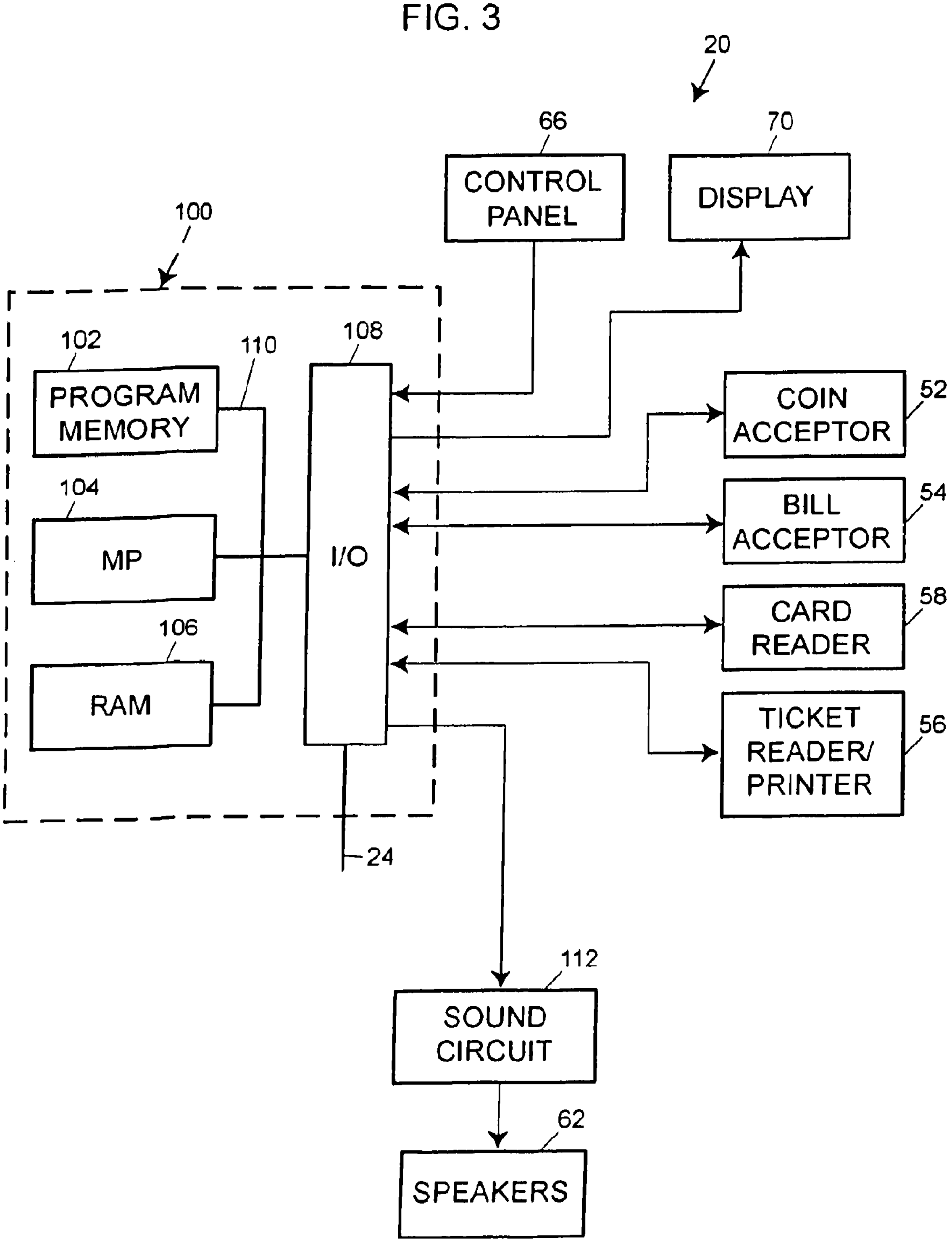
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
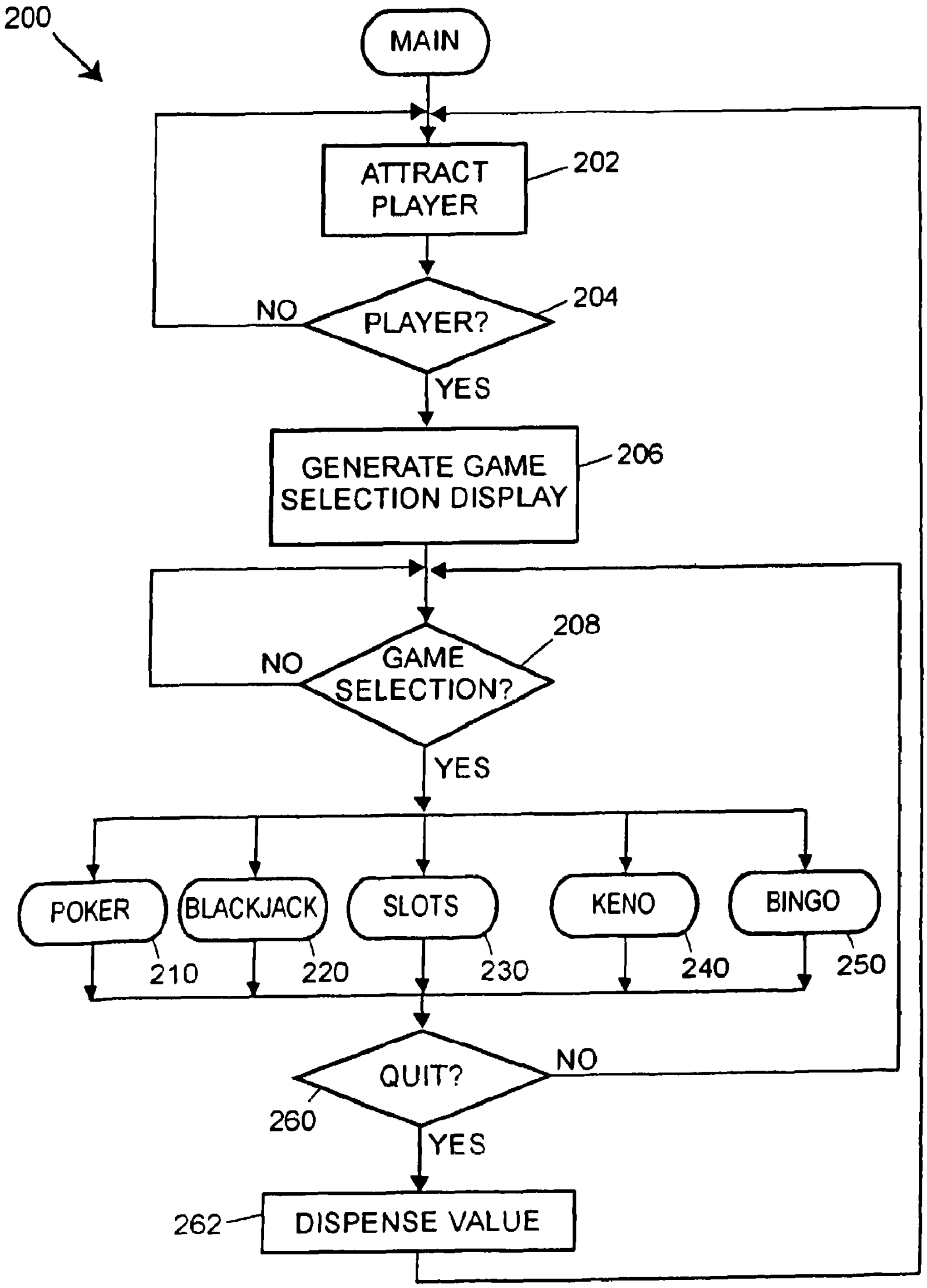
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
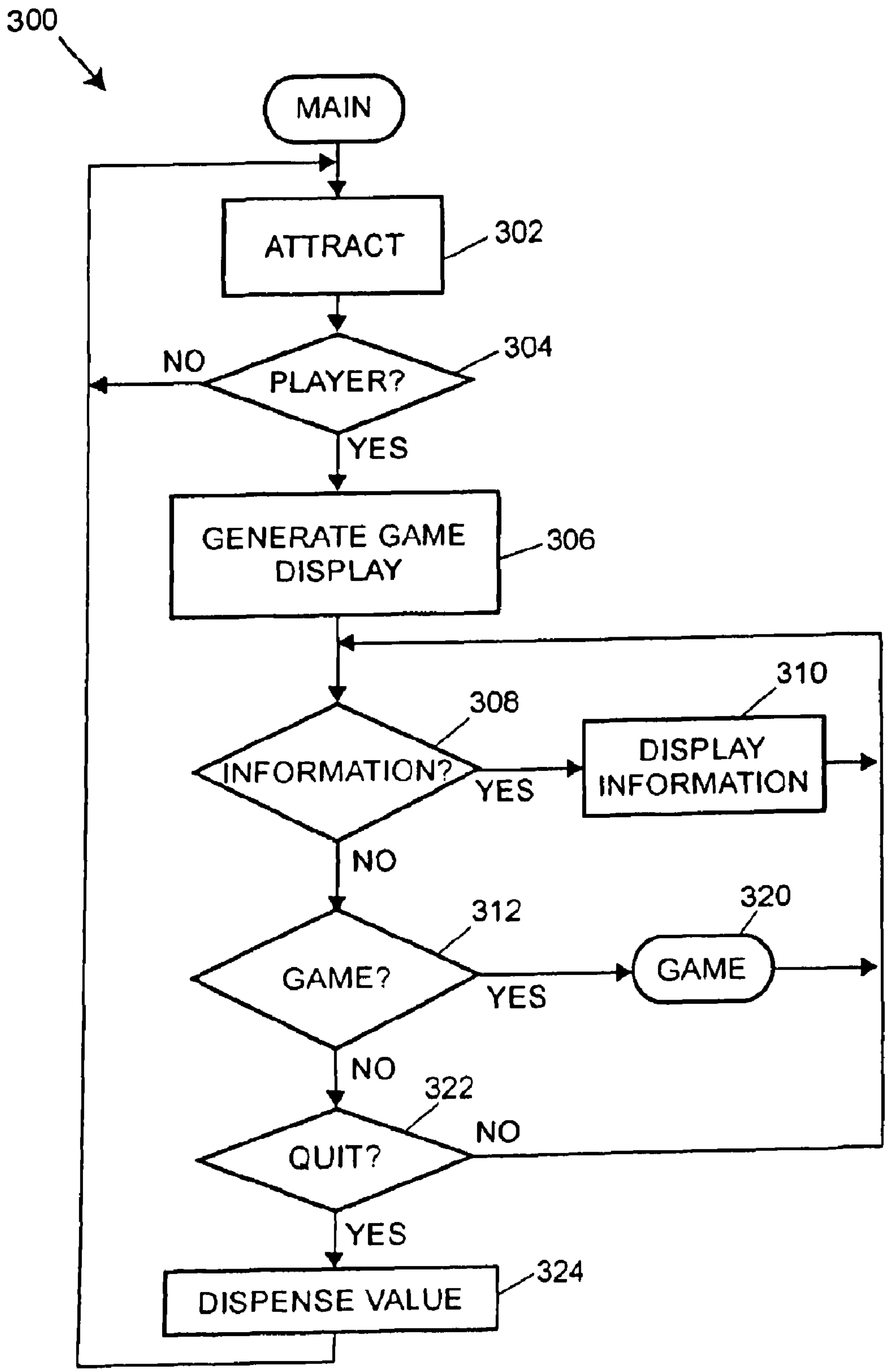
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Figure 6:
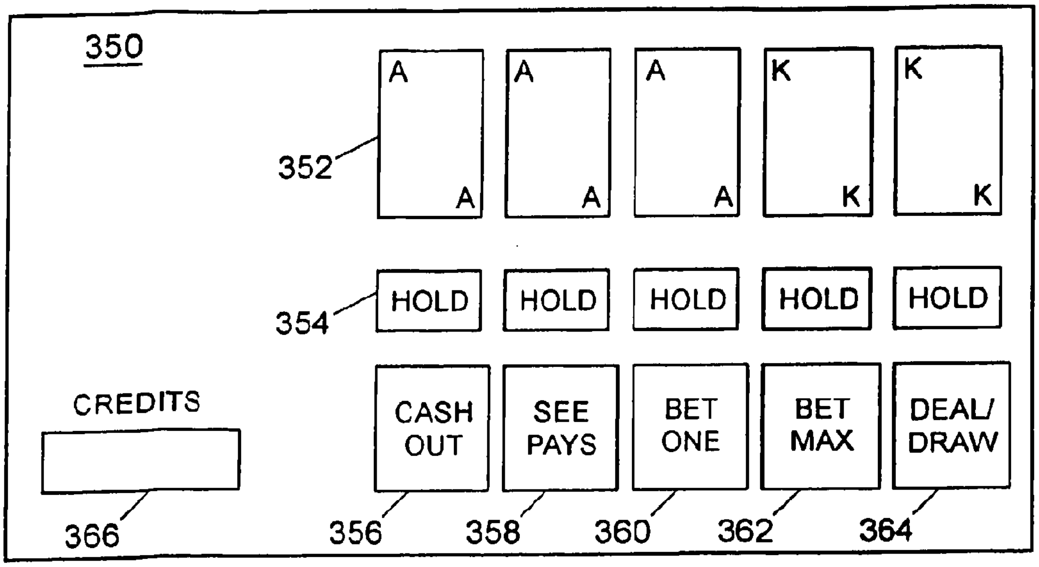
FIG. 6 is an illustration of an embodiment of a visual display that may be displayed during performance of the video poker routine of FIG. 8.

Video Poker

Where the gaming unit 20 is designed to facilitate play of a video poker game, the display unit 70 may comprise a video display unit. FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
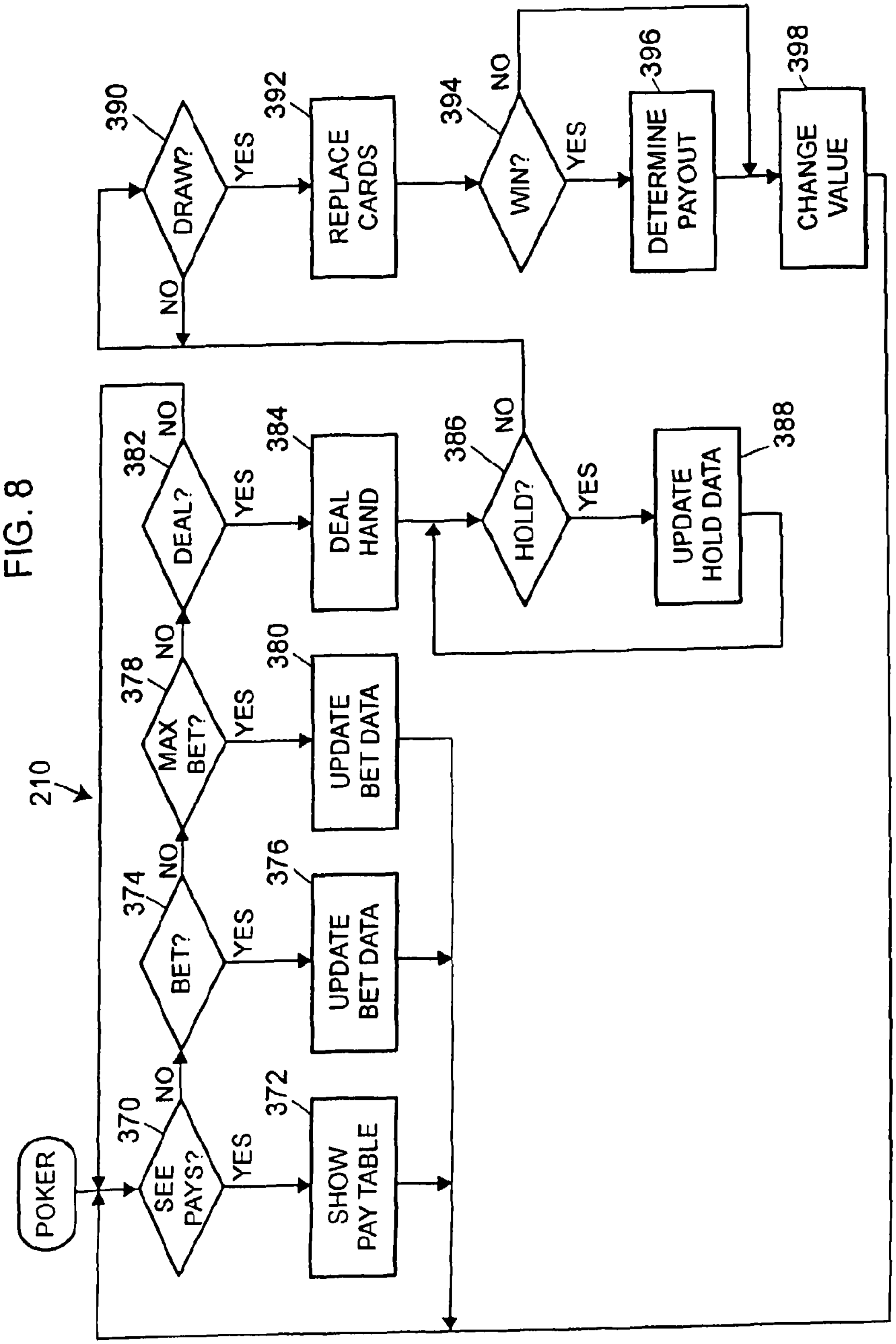
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7:
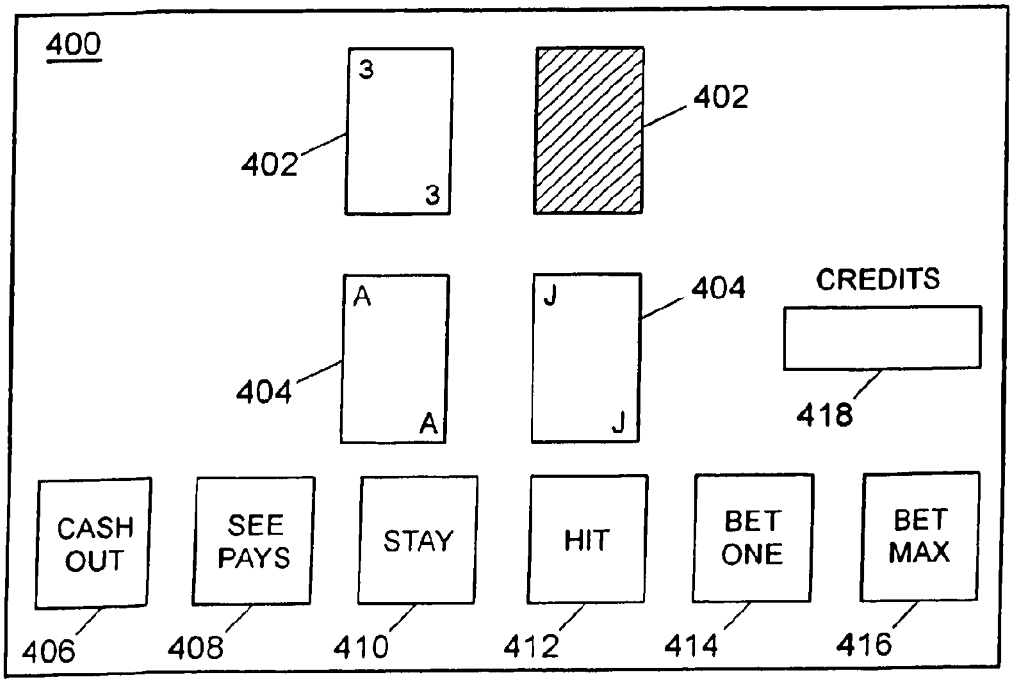
FIG. 7 is an illustration of an embodiment of a visual display that may be displayed during performance of the video blackjack routine of FIG. 9.

Video Blackjack

Where the gaming unit 20 is designed to facilitate play of a video blackjack game, the display unit 70 may comprise a video display unit. FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
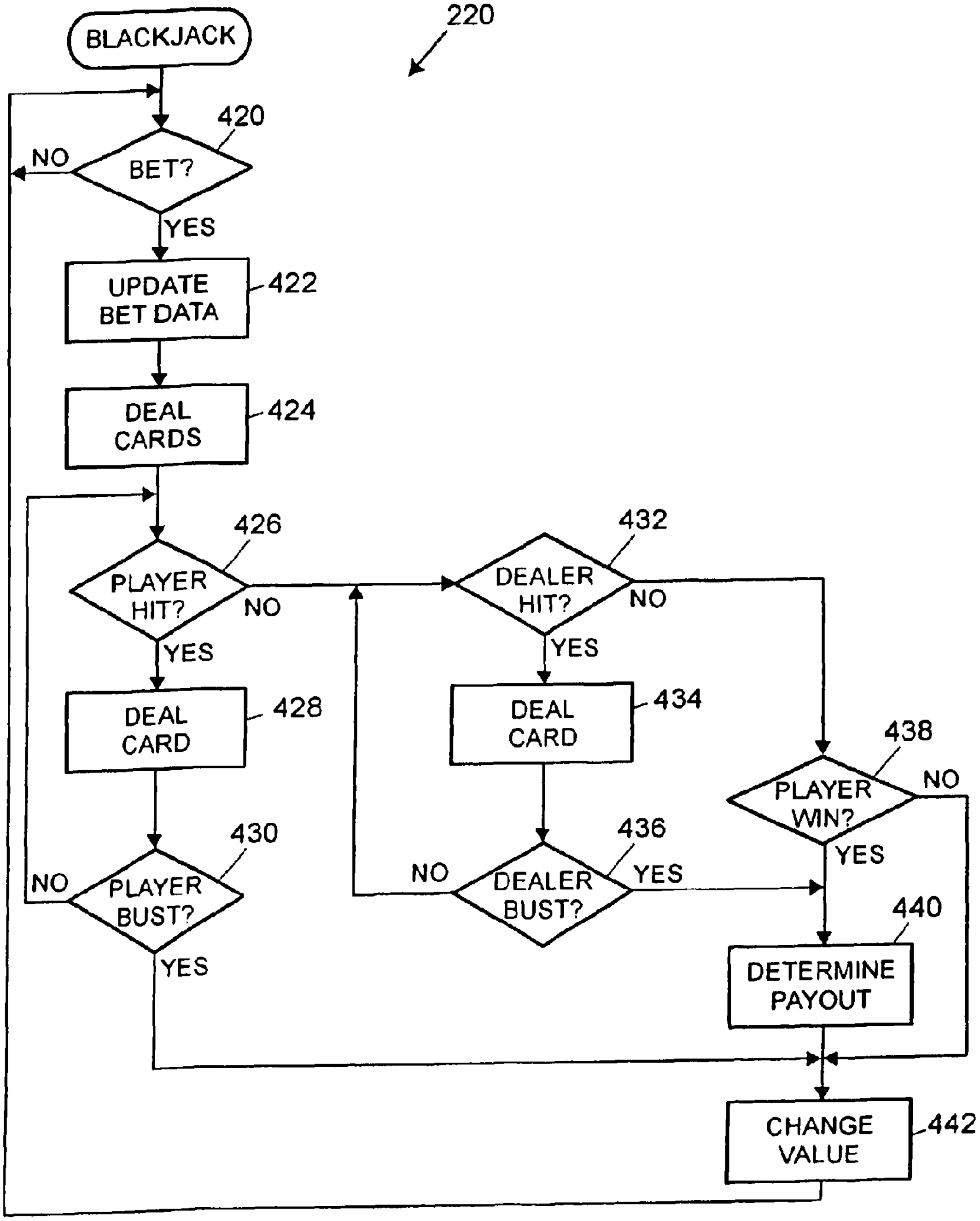
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Figure 10:
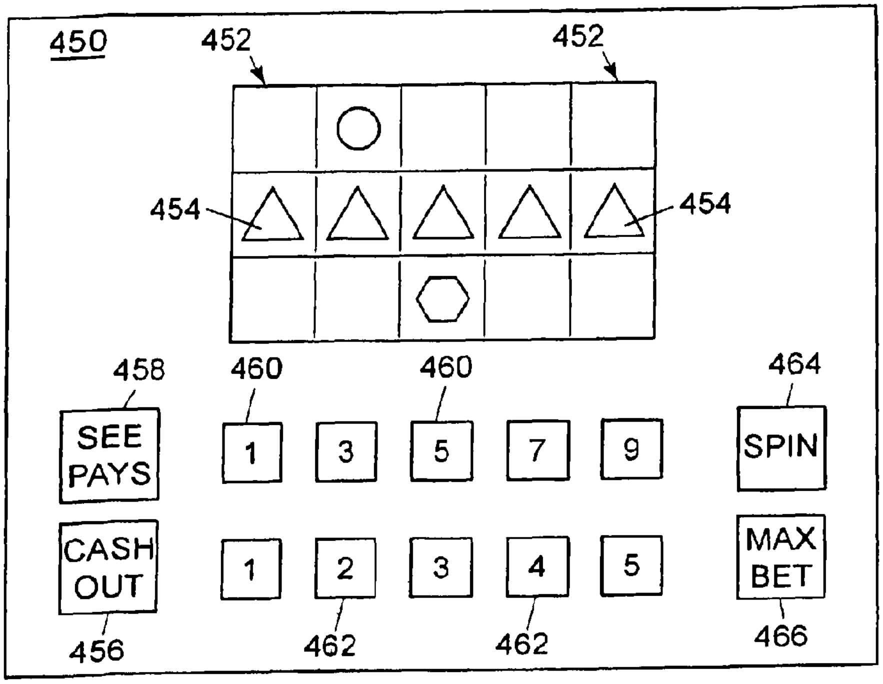
FIG. 10 is an illustration of an embodiment of a visual display that may be displayed during performance of the slots routine of FIG. 12.

Slots

Where the gaming unit 20 is designed to facilitate play of a video slots game, the display unit 70 may comprise a video display unit. FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
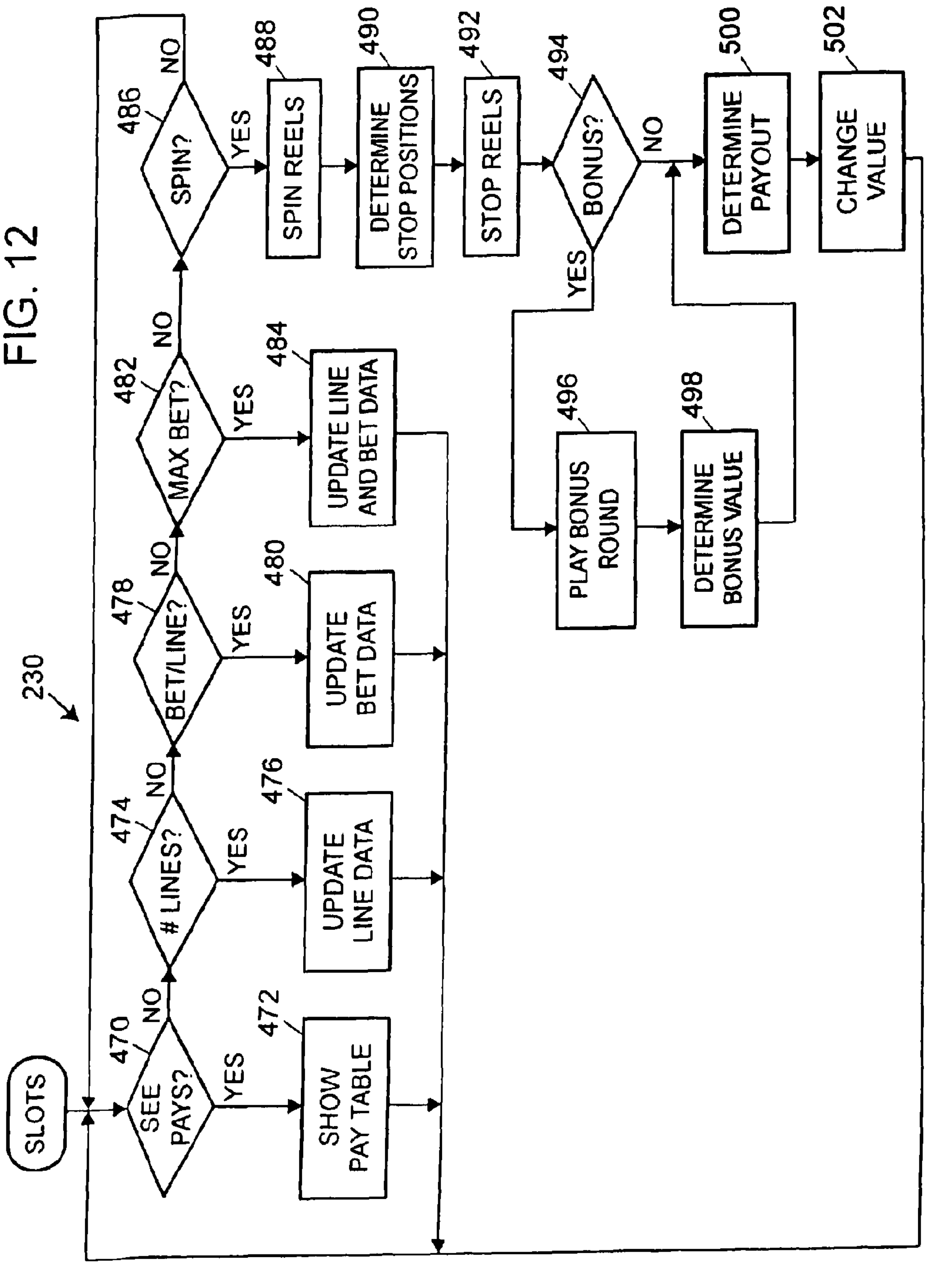
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 11:
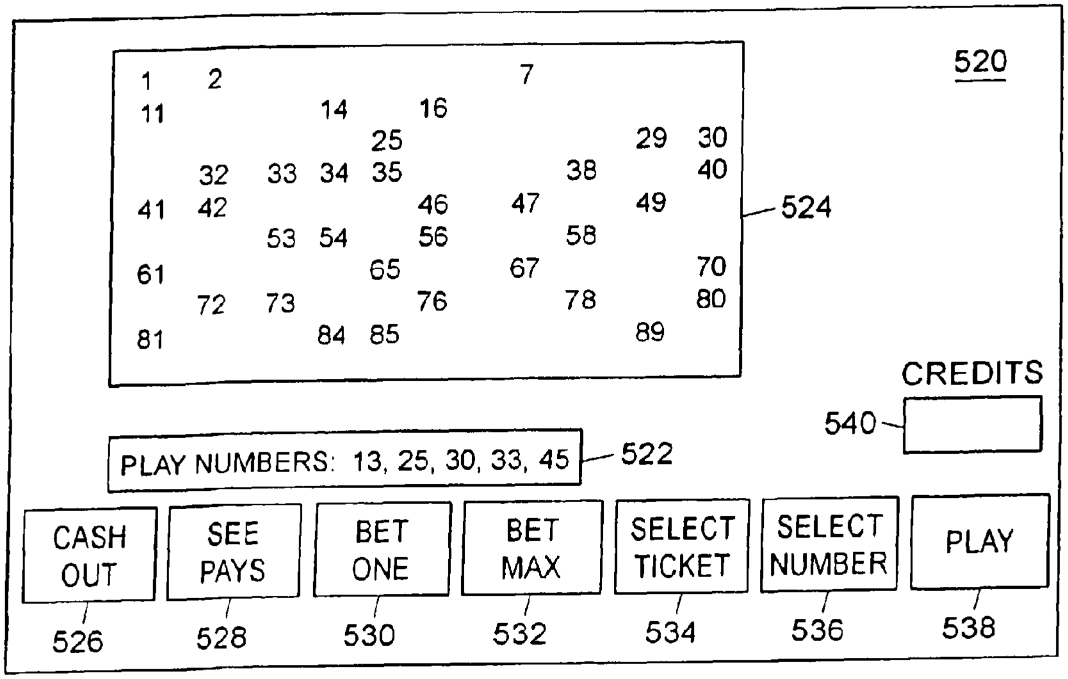
FIG. 11 is an illustration of an embodiment of a visual display that may be displayed during performance of the video keno routine of FIG. 13.

Video Keno

Where the gaming unit 20 is designed to facilitate play of a video keno game, the display unit 70 may comprise a video display unit. FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
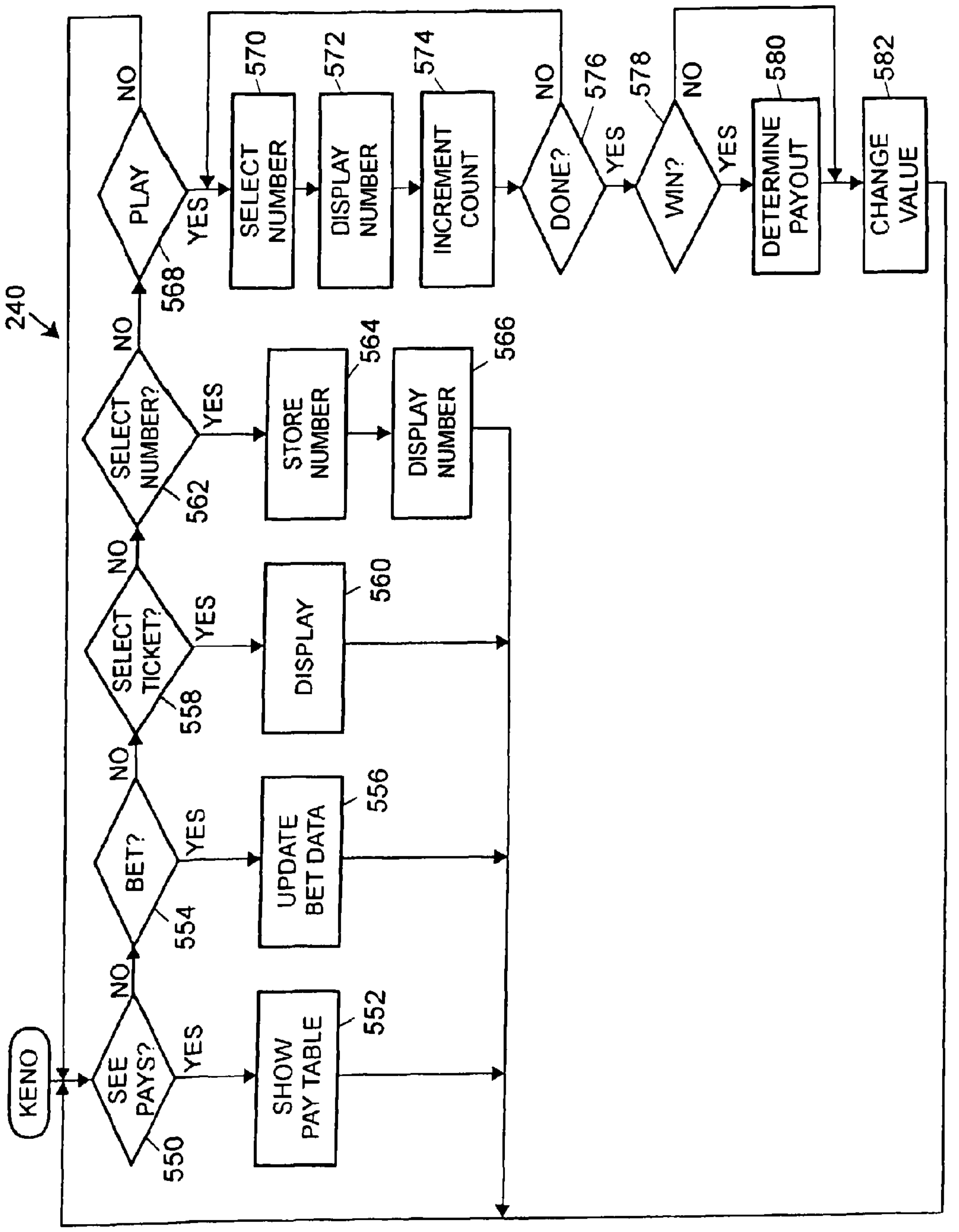
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Figure 14:
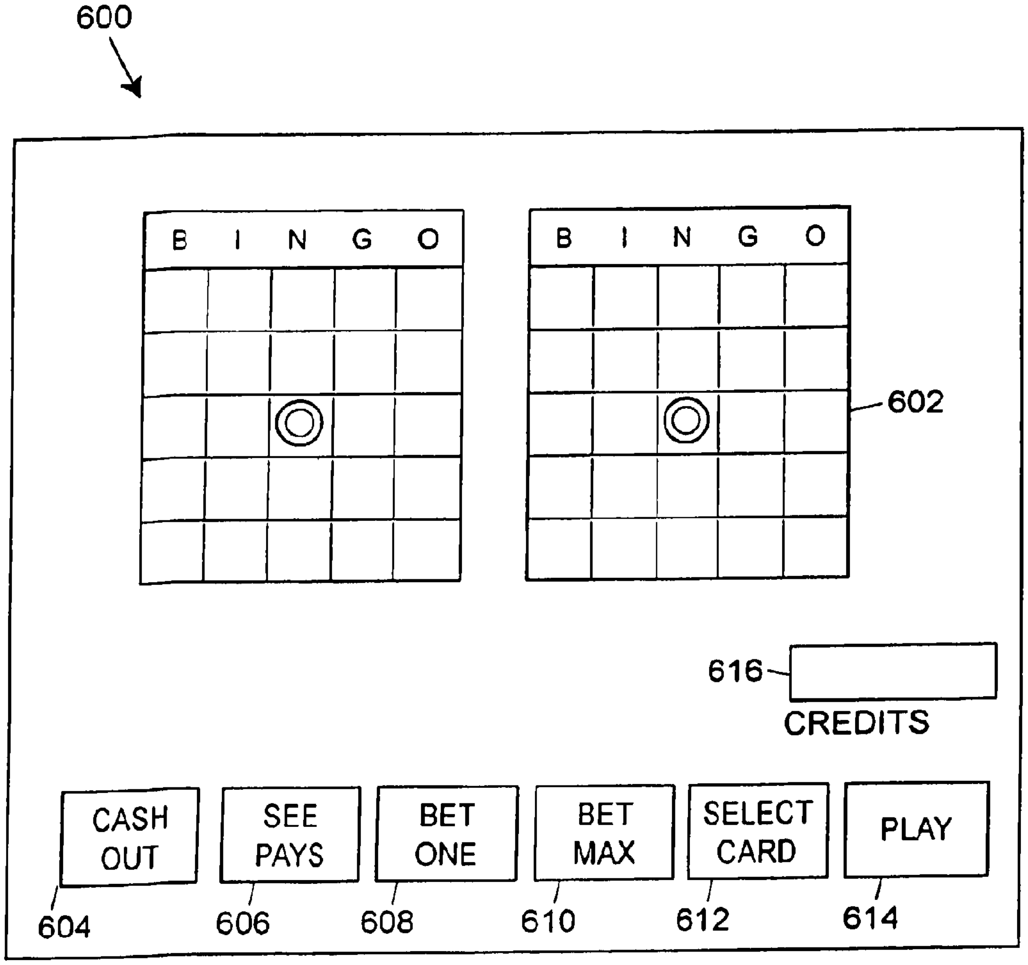
FIG. 14 is an illustration of an embodiment of a visual display that may be displayed during performance of the video bingo routine of FIG. 15.

Video Bingo

Where the gaming unit 20 is designed to facilitate play of a video bingo game, the display unit 70 may comprise a video display unit. FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
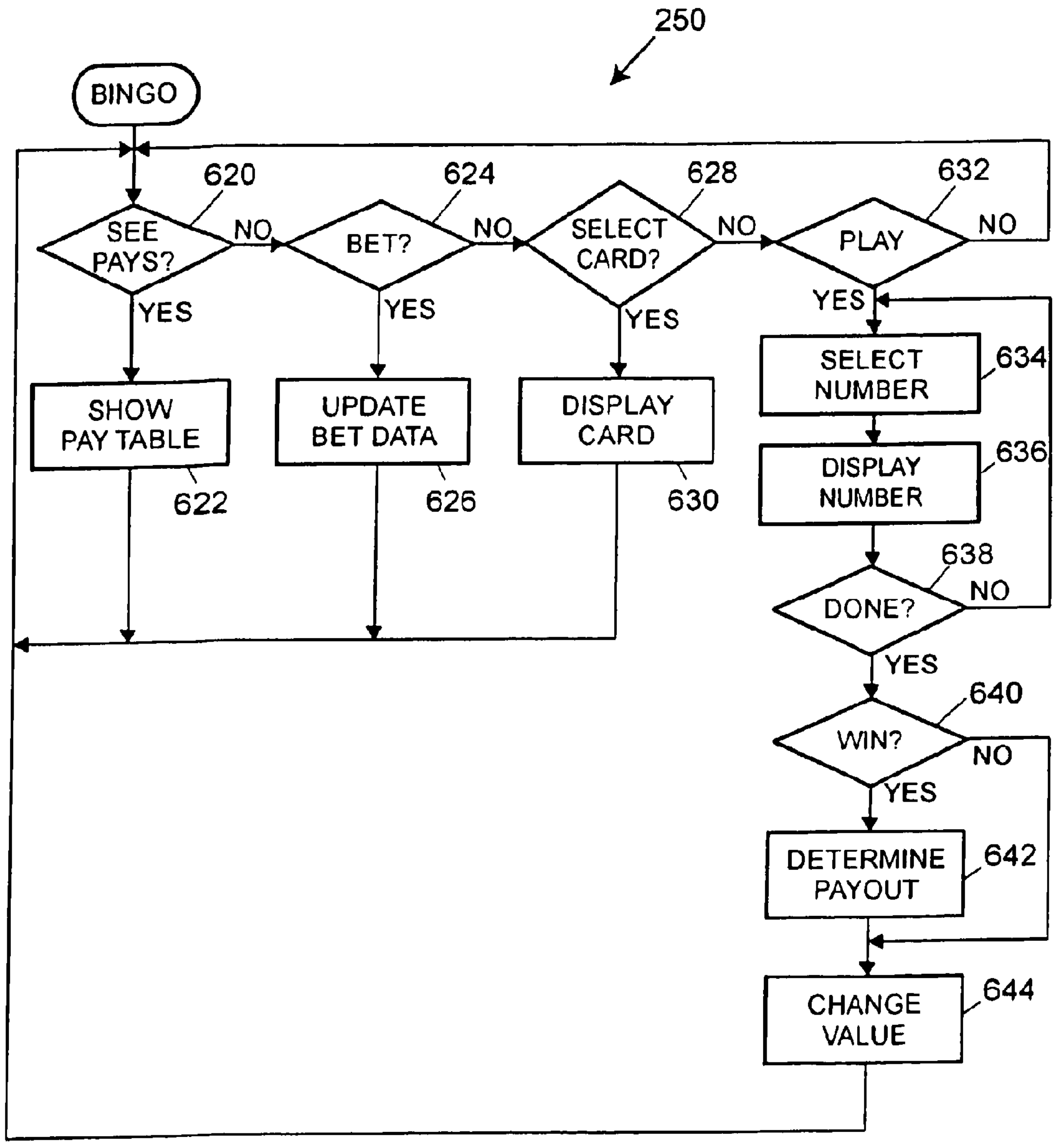
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Secondary Applications

Referring again to FIG. 3, the controller 100 of the gaming unit 20 may be configured to execute one or more software applications that are secondary to the example game routines described above with reference to FIGS. 4-15. These secondary applications may provide the player, an employee of a casino, a technician, etc., with information associated with, and/or alert a person of, an event that is peripheral to the game routines. For example, a secondary application may provide time information, weather information, notify a player when a show is about to begin, or may notify an employee when the ticket printer 56 is running low on paper. Also, a secondary application may interface with a game routine (e.g., a game routine as described above with reference to FIGS. 4-15). For example, a secondary application may interact with a game routine to provide an additional condition that triggers a bonus, that provides a particular bonus game routine, etc.

Figure 16:
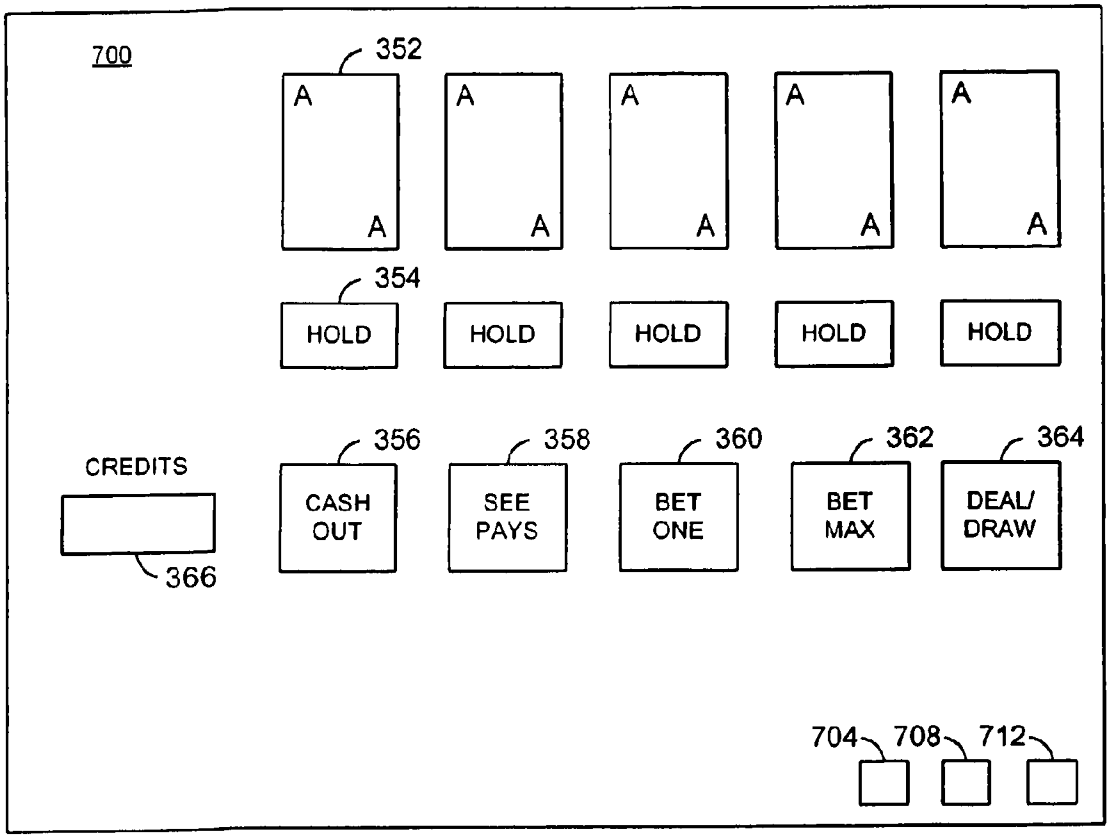
FIG. 16 is an illustration of an example visual display that includes icons associated with secondary software applications.

For each secondary application, the controller 100 may cause an icon to be displayed on the display unit 70 simultaneous with a game image (e.g., game images such as those of FIGS. 6, 7, 10, 11, and 14). FIG. 16 illustrates an example display 700 that includes the game display of FIG. 6 along with icons 704, 708, and 712 associated with several secondary applications. In operation, the icons may notify the player, the employee of the casino, the technician, etc., that the corresponding secondary applications are running. Additionally, the icons may alert the player, the employee of the casino, etc., that an event has occurred. For instance, an icon may flash, blink on and off, change color, etc., when the corresponding secondary application detects an event. As just one example, a secondary application may detect an alarm, a timer event, etc., that indicates a show is to begin in the near future. As another example, a secondary application may detect that the ticket printer is low on paper. In some embodiments, an icon, window, display screen, etc., corresponding to the secondary application may not be displayed when the secondary application starts running, but only after some event has occurred (e.g., a timer expires, a condition is satisfied, a player action is detected, etc.).

The icons generally may be displayed simultaneously with the game image, and the icons should not substantially obstruct the game image. Similarly, the game image should not substantially obstruct the icons. For example, an icon may appear in a background portion of a game image and not overlap with foreground portions of the game image (e.g., images of playing cards, reels, numbers, etc.). Referring to FIG. 16, icons 704, 708, and 712 appear in the background of the game display 700. As another example, an icon may overlap with foreground portions of the game image, but the icon may be of a size such that information conveyed by the game image is still discernable by the player. For example, an icon may overlap with the image of a playing card, but the player may still be able to discern which card is displayed because portions of the card remain visible to the player. Referring to FIG. 16, one or more of icons 704, 708, and 712 could overlap, for example, with portions of the images of the cards 352, and/or the buttons 354, 356, 358, 360, 362, and 364, in a manner such that a player can still discern which cards 352 are displayed and/or which buttons 354, 356, 358, 360, 362, and 364 are displayed. As yet another example, an icon may overlap with a foreground portion of the image, but the icon may appear to be semi-transparent and thus allow a viewer to see what is "behind" the icon. An alpha-blending technique, for instance, could be used to display the icon and the foreground image.

In some gaming units 20, the gaming unit may include a main display on which the game image is to be displayed as well as a secondary display, separate from the main display, for displaying information such as bonus information, player tracking information, advertisements, etc. With such gaming units, the icons may be displayed on the secondary display while the game image is displayed on the main display. Thus, although FIG. 16 illustrates the icons and the game image on a single display, the icons and the game image may be displayed simultaneously via separate display units.

Any of a variety of secondary applications that provide a player with tools, information, etc., can be used such as the following examples: 1) a timer program that a player can use to keep track of the amount of time elapsed; 2) a clock program that provides a time of day and, optionally, can be used to set alarms; 3) a calendar program that permits a player to keep track of one or more (or none) of events or activities such as shows, sporting events, tournaments, dinner reservations, a travel itinerary, etc.; 4) a program that alerts a player of events or activities such as a show, sporting event, etc., to which the player has purchased tickets; 5) a program that alerts a player of upcoming dinner reservations; 6) a program that alerts a player of an auction, raffle, etc., in which the player is interested; 7) a program that provides weather information to the player; 8) a program that notifies the player of promotions; 9) a program that displays player tracking points earned by the player; 10) a program that permits a player to change aspects of a game associated with the game's "look and feel"; 11) a program that permits a player to choose a type of bonus game from among several choices; 12) a program that permits a player to set a loss threshold and alerts the player when the player is approaching and/or has progressed beyond that threshold; 13) a program that alerts a player when a jackpot has reached a particular amount; 14) a program that alerts a player when a friend, family member, etc., has logged onto a gaming machine, started playing in a tournament, etc.; 15) a program that alerts a player when an email has been received; 16) a program that alerts a player when an instant message has been received; etc.

Other types of secondary applications that provide a casino, game unit operator, etc., with tools, information, etc., can be used such as the following examples: 1) a program that sets a condition, event, etc., which will trigger a bonus game; 2) a program that permits the "look and feel" of a game to be changed; 3) a program that provides guidance to employees as to how to assist a player (e.g., provide player with enhanced service, leave player alone, etc.); 4) programs that provide diagnostics information associated with the gaming unit, etc.

Referring to FIG. 1, a secondary application may retrieve or receive information from another computing device such as another gaming unit 20, another gaming unit 30, the network computer 22, or the network computer 32. Also, the secondary application may retrieve or receive information from computing devices not shown in FIG. 1, but operatively coupled to the network 40. For example, computers associated with a casino, a hotel, a restaurant, a valet service, an airline, a weather information service, a news service, etc., could provide information to the secondary application via the network 40. Also, the user's personal digital assistant (PDA), lap top computer, cellular phone, desktop computer, etc., could provide information to the secondary application via the network 40.

Loading Secondary Applications

Figure 17:
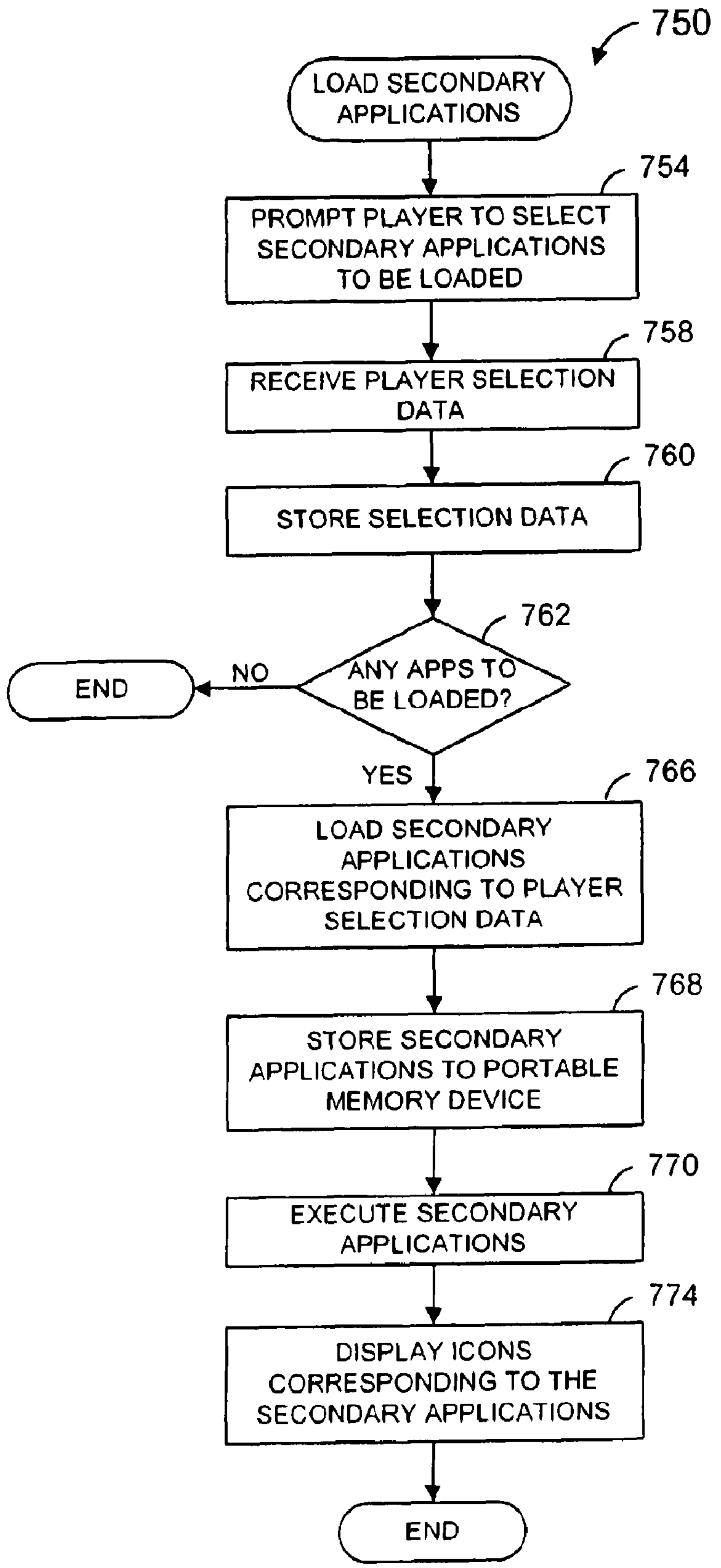
FIG. 17 is a flowchart of an embodiment of a routine for loading secondary software applications.

In one embodiment, a player may be permitted to select secondary applications to be loaded to the gaming unit 20. FIG. 17 is a flowchart of one embodiment of a routine 750 for loading secondary applications to the gaming unit 20. At a block 754, the player may be prompted to select secondary applications that the player would like to be loaded to the gaming unit 20. For example, a selection screen or screens may be displayed on the display unit 70 of the gaming unit. The player may select desired secondary applications by using, for example, a touchscreen, a touchpad, mechanical buttons, a mouse, a joystick, a trackball, etc.

Figure 18:
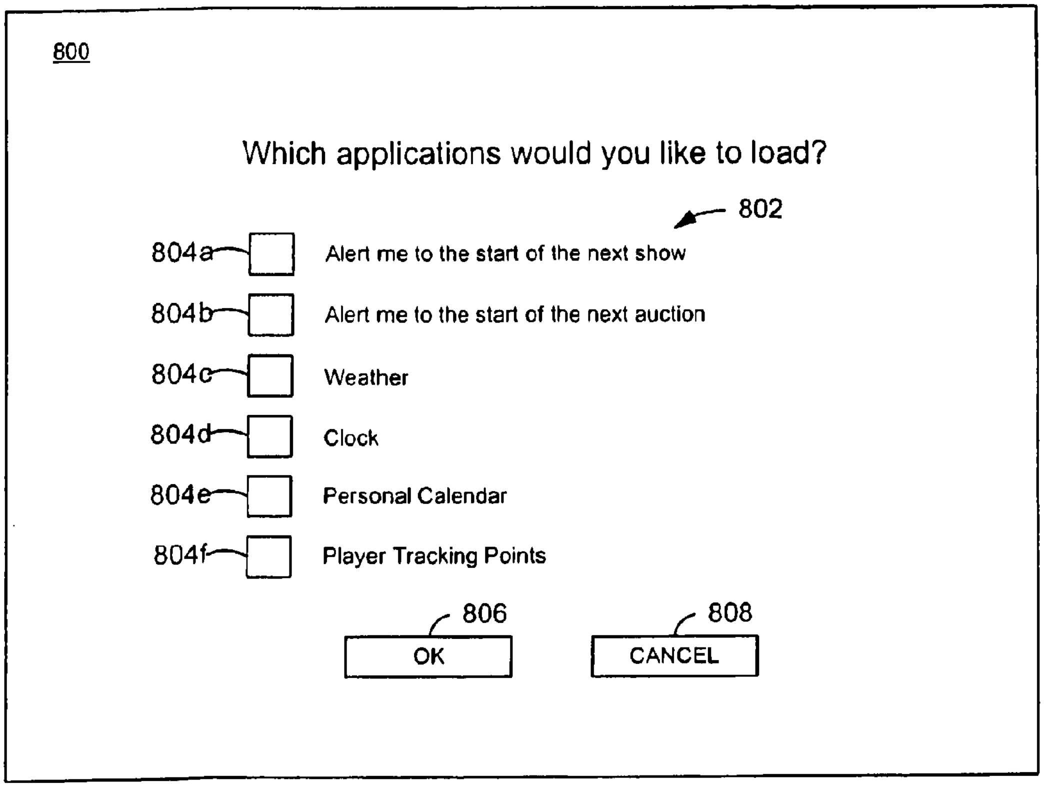
FIG. 18 is an illustration of an example visual display for prompting a person to select secondary software applications to be loaded.

FIG. 18 is an example selection screen 800 for prompting a person to select secondary applications for loading to the gaming unit 20. The selection screen 800 includes a list 802 of applications that can be loaded to the gaming unit 20, and buttons 804 associated with the applications. A player may select applications, if any, that the player would like loaded to the gaming unit 20 by activating the appropriate buttons 804. When an application is selected by a player, the selection may be indicated to the player by, for example, highlighting the associated text in the list 802, displaying a "check mark" in the associated button 804, etc. When the player has finished selecting applications, the player may select the button 806. Additionally, the player may select the button 808 if the player does not wish to download any applications in the list 802.

Referring again to FIG. 17, at a block 758, player selection data corresponding to the secondary applications that the player would like to be loaded is received. At an optional block 760, selection data indicative of the secondary applications that the player would like to be loaded may be stored. For instance, the selection data may be stored at the network computer 22, at the gaming unit 20, some other computer, on a portable memory device, etc. The stored selection data may be used, for example, when a player subsequently uses a different gaming unit 20. Thus, instead of again prompting the player to select secondary applications the player would like loaded to the different gaming unit 20, the stored selection data may be referenced to determine what secondary applications the player would like loaded.

At a block 762, it may be determined if the player has selected any secondary applications to be loaded. If the player has not selected any secondary applications to be loaded, the routine may end. If, however, the player has selected at least one secondary application to be loaded, the flow may proceed to a block 766.

At the block 766, the secondary applications selected by the player may be loaded to the gaming unit 20. If the gaming unit 20 is part of a gaming system such as the gaming system of FIG. 1, the network computer 22, or some other computer, may load the selected secondary applications to the gaming unit 20. For example, the gaming unit 20 may send a request to the network computer 22 indicating the secondary applications that the player wishes to load. Then, the network computer 22 may transmit the requested secondary applications.

At an optional block 768, one or more of the secondary applications may be stored to a portable memory device (e.g., a memory card, a memory stick, a smart card, etc.) of the player. Thus, when a player subsequently uses a different gaming unit 20 and the player has inserted the portable memory device into the gaming unit 20, the secondary applications may be loaded from the portable memory device.

At a block 770, the controller 100 of the gaming unit 20 may execute the secondary applications loaded to the gaming unit 20 at the block 766. The controller 100 may be configured to execute secondary applications once loaded to the controller, upon the occurrence of some other event, upon a condition being satisfied, etc.

In one embodiment, the secondary applications may comprise a software program in a form that can be executed by multiple types of computing platforms rather than being written or compiled for a specific computing platform. For example, the controller 100 may be configured to include an interpretor to convert instructions of a secondary application into instructions that the microprocessor 104 can execute. As another example, the controller 100 may be configured to include a just-in-time compiler to compile the instructions of the secondary application into instructions that the microprocessor 104 can execute. In another embodiment, secondary applications are written or compiled specifically for the computing platform corresponding to the gaming unit 20 on which the secondary application is intended to be executed. In such an embodiment, the controller 100 need not be configured to include an interpretor and/or a just-in-time compiler in order to execute the secondary application.

Then, at a block 774, icons corresponding to the secondary applications may be displayed on the display unit 70 of the gaming unit or on a secondary display. In some embodiments, an icon corresponding to a secondary application is not displayed until some event is detected by the secondary application. In other embodiments, an icon corresponding to a secondary application need not be displayed.

Figure 19:
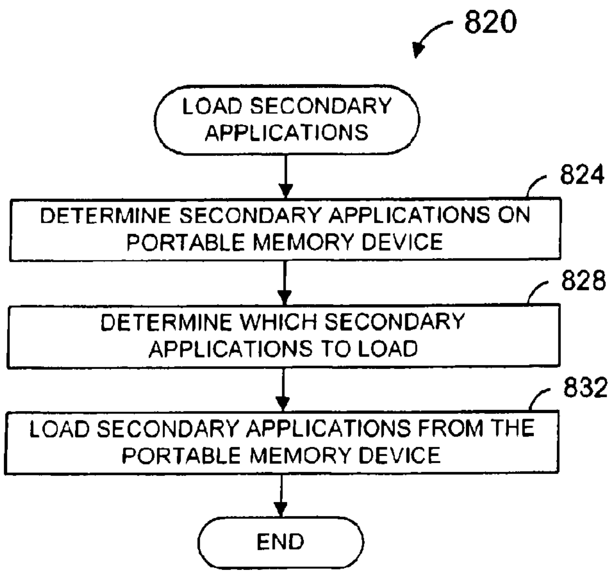
FIG. 19 is a flowchart of another embodiment of a routine for loading secondary software applications.

FIG. 19 is a flowchart of another embodiment of a routine 820 for loading secondary applications to the gaming unit 20. In this embodiment, the gaming unit 20 may include a device for loading information from portable memory devices such as a smart card, a memory card, a memory stick, PDA, etc., and the player may have a portable memory device on which secondary applications may be stored. At a block 824, it may be determined which secondary applications are stored on the portable memory device. At an optional block 828, it may be determined which of the secondary applications stored on the portable memory device the player would like to be loaded to the gaming unit 20. For example, the player may be prompted with a selection screen, window, etc. Then, at a block 832, the secondary applications stored on the portable memory device, or those selected by the player at the block 828, may be loaded from the portable memory device to the gaming unit 20.

A routine similar to the routine 750 and/or the routine 820 also may be used by a casino employee, a gaming unit operator, etc., to load secondary applications to gaming units 20. Such a routine may be executed on a gaming unit 20 or on a network computer 22, and the casino employee may cause selected secondary applications to be loaded to a particular gaming unit 20, or to multiple gaming units 20. For example, a similar routine may additionally permit the casino employee to select to which gaming units 20 the secondary applications are to be loaded.

Conveying Information Via Secondary Applications

Figure 20:
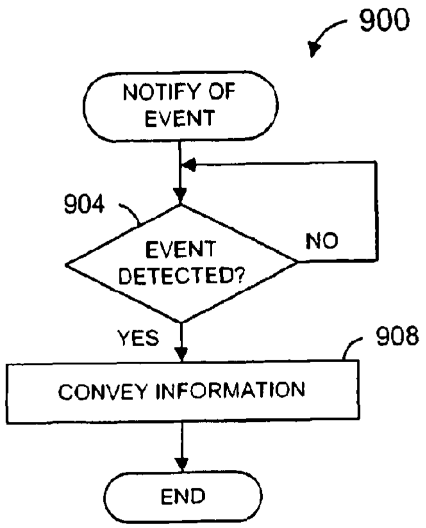
FIG. 20 is a flowchart of and embodiment of a routine for conveying information via a secondary application.

The secondary applications may convey information to a player, employee, technician, etc., in different manners. FIG. 20 is a flowchart of an embodiment of a routine 900 for conveying information via a secondary application. At a block 904, the routine may wait until an event is detected. For example, the secondary application may implement a timer, and the routine may wait until the timer expires. Similarly, the secondary application may monitor software and/or hardware conditions in the gaming unit 20 to determine if an event occurred. Also, the secondary application may receive a notification that an event occurred. The notification may be received from another software program implemented by the gaming unit 20. Referring to FIG. 1, the secondary application may receive a notification sent via the network data link 24 and/or the network data link 34, wherein the notification indicates that an event has occurred. For example, another gaming unit 20, 30, the network computer 22, the network computer 32, or some other device coupled to the network data link 24, the network data link 34, or the network 40 may generate the notification. Also, the secondary application may periodically request information from another gaming unit 20, 30, the network computer 22, the network computer 32, or some other device coupled to the network data link 24, the network data link 34, or the network 40. The secondary application may then analyze information received in response to its request to determine if an event occurred. Further, the event may include a user input such as the user activating a button or icon.

Figure 21:
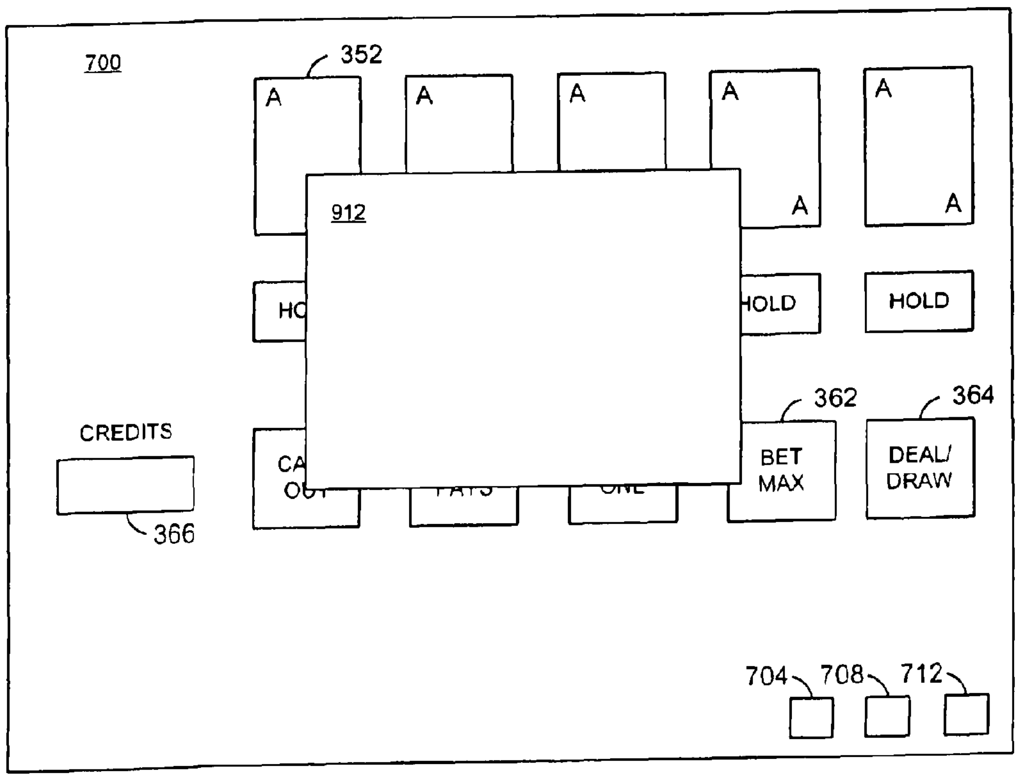
FIG. 21 is an illustration of an example visual display that includes a window associated with a secondary software application.

If the event is detected, the flow may proceed to a block 908. At the block 908, information may be conveyed to the player, employee, technician, etc. For example, an icon associated with the secondary application may be changed (e.g., flashed on and off, its color changed, its size changed, it may be animated, etc.). As another example, the secondary application may cause the gaming unit 20 to generate sound via the speakers 62. As an additional example, a window, a display screen, etc., may be displayed on the display unit 70 to convey information. FIG. 21 illustrates the example display 700 of FIG. 16 with a window 912 that can be used to display information to a player, casino employee, technician, etc.

As discussed above, the secondary software applications may provide the player, the casino employee, the technician, etc., with information and/or alert a person of an event that is peripheral to the game routines. In some embodiments, the secondary applications may interact with game routines such as the game routines described with reference to FIGS. 4-15. As just one example, a secondary application may interact with a game routine to provide an additional event that triggers a bonus. Such a secondary application may be loaded to a gaming unit 20 by, for example, a casino employee to provide an additional bonus triggering event as a "special of the day," a promotion, etc. An icon associated with the secondary application could indicate the bonus triggering condition. For example, if the additional bonus triggering condition were three cherries for a reel-type slots game, the icon could include an image of three cherries. As another example, the icon could merely include an image generally indicative of a bonus (e.g., such as including the word "bonus," or the words "bonus of the day"). Then, the player could activate the icon and, in response, a window, for example, could be displayed on the display unit 70 which could convey to the player what event would trigger the bonus.

Additionally, a secondary application could monitor events associated with game routines. For example, a secondary application could monitor how close a player is to reaching a game condition such as a bonus event, a next prize plateau, etc. When the player comes within some threshold of achieving the monitored condition, the secondary application could convey information to the player or a casino network server (via speakers 62, a window, a screen, flashing the icon, animating the icon, a network message, etc.) that indicates that the player is coming close to achieving the condition.

Secondary Applications Toolbar

Figure 22:
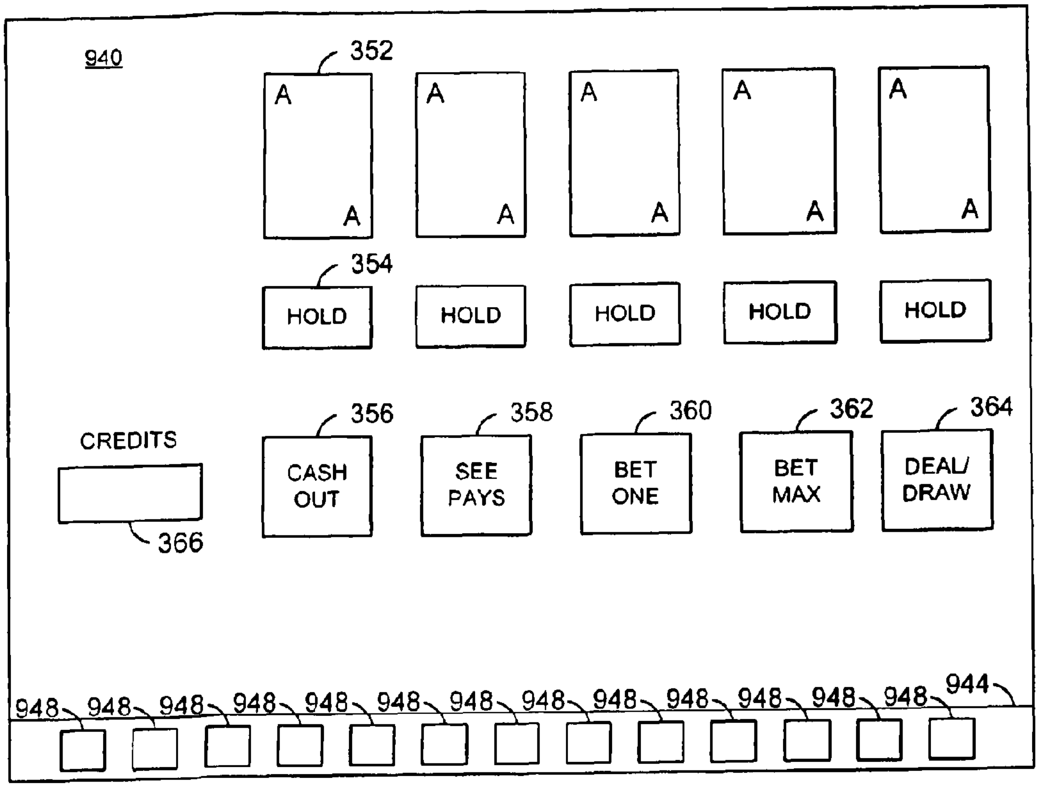
FIG. 22 is an illustration of an example visual display that includes a toolbar associated with secondary software applications.

FIG. 22 illustrates another example display 940 that includes the game display of FIG. 6 along with a toolbar 944. The toolbar 944 includes a plurality of icons 948 associated with several secondary applications. Although thirteen icons 948 are illustrated in the toolbar 944 of FIG. 22, more or less icons can be provided in a tool bar. For example, one, ten, twenty-five, fifty, or one hundred icons may be provided. Also, although the toolbar 944 is illustrated at the bottom of the display 940, a toolbar may be located in other portions of a display as well such as the top, along either side, etc. Additionally, a plurality of toolbars may be provided. For example, a first toolbar along the top of a display and a second toolbar along the bottom of the display may be provided. Further, a toolbar may be provided on a display separate from the main game display of a gaming unit, such as on a separate display used, for example, to display player tracking information, advertisements, promotions, etc.

Internet Gaming

Figure 23:
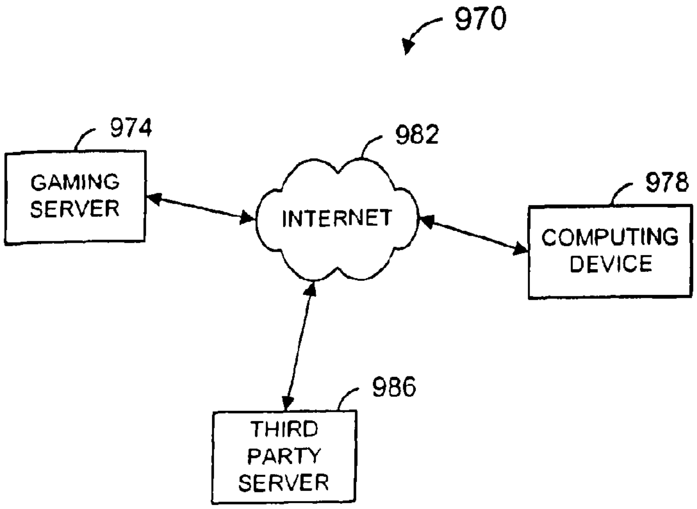
FIG. 23 is an illustration of an example system in which secondary software applications may be utilized.

FIG. 23 illustrates a system 970 in which a player may play games via a network such as the Internet. The system 970 may include a gaming server 974 operatively coupled to a computing device 978 via a wide area network 982. The gaming server 974 may comprise, for example, a mainframe, a server, a workstation, a desktop computer, a laptop computer, etc. The computing device 978 may comprise, for example, a server, a workstation, a desktop computer, a laptop computer, a personal digital assistant, a cellular phone, a television set top box, a television, etc. The wide area network 982 may include, for example, an internet, the Internet, an intranet, an extranet, etc. The gaming server 974 may be operatively coupled to the network 982 via, for example, a wired link such as a telephone line, a T1 line, a T3 line, a fiber optic link, a wired local area network (LAN), etc., or a wireless link such as a satellite link, a radio frequency link, etc. The computing device 978 may be operatively coupled to the network 982 via, for example, a wired link such as a telephone line, a T1 line, a T3 line, a digital subscriber line link, a fiber optic link, a cable television link, a wired LAN, etc., or a wireless link such as a satellite link, a cellular link, a microwave link, a wireless LAN, etc. The system 970 may also include a third party server 986 operatively coupled to the wide area network 982. The third party server 986 may be associated with a third party such as a provider of weather information, news information, advertisements, promotions, etc.

In operation, the gaming server 974 in conjunction with the computing device 978 may implement game routines, such as one or more of the game routines described with reference to FIGS. 6-15. A display unit associated with the computing device 978 may display a displays such as the displays of FIGS. 16, 18, 21, and 22. Also, the gaming server 974 and/or the computing device 978 may implement routines such as the routines of FIGS. 17, 19, and 20.

Further Examples of Secondary Applications

Many types of secondary applications may be employed such as the following examples. A secondary application can be used to provide an advertisement, product/service promotions, product/service discounts, coupons, etc. For instance, an icon may include an image of a logo of product, company, etc. Also, if the icon is selected by a player, further information about the product, company, etc., can be conveyed to the player via a window, display screen, speakers, etc. Also, the player could print out information, coupons, etc., via a printer.

A secondary application can be used to provide news information, stock information, etc. For instance, an icon may include an image of a logo of news service, the word "news," an image of a newspaper, an image of a stock price service, etc. The secondary application may alert that player when a news alert is detected, a particular stock price or stock index value is reached, a change in a stock price or stock index value of a particular magnitude is detected, etc. For example, the icon may blink, become animated, change colors, a window may pop up, a news ticker or a stock ticker may appear across a portion of the screen, etc. Also, if the icon is selected by a player, further information about the product, company, news, stock, index, etc., can be conveyed to the player via a window, display screen, speakers, etc.

A secondary application can be used to retrieve information from a player. For instance, an icon can be displayed that corresponds to secondary application associated with registering a player with a casino, gaming service, etc. If the player selects the icon, the secondary application may prompt the player to enter player information and may then facilitate registering the player.

A secondary application can be used to enter a player in a promotion, a raffle, an auction, a tournament game, etc. Further, a secondary application can be used to obtain hotel reservations, restaurant reservations, tickets to shows, a taxi, to confirm airplane arrival/destination times, etc. Similarly, a secondary application can be used to inform a player that a hotel room is ready, a car has been retrieved by a valet, that a progressive jackpot has reached a certain size, when an auction is about to begin, etc. If the player enters an auction, an icon could allow casino personnel to identify who is entered in the auction. This could allow, for example, casino personnel to show samples of what was being auctioned to players signed up for the auction.

A secondary application can be used to provide various diagnostic information related to a gaming unit. Referring to FIG. 3, secondary applications can be used to obtain information related to various components of a gaming unit 20 such as the coin acceptor 52, the bill acceptor 54, the ticket reader/printer 56, etc. Icons corresponding to various components could be displayed, where each icon may include an indication (e.g., an image, word, abbreviation, etc.) of the component to which it corresponds. An employee, technician, etc., could select an icon and diagnostic information related to the component could be conveyed to the user via a window, display screen, speaker 62, etc.

What is claimed is:

1. A casino gaming server comprising:

a communications interface, wherein the communications interface is configured to provide communications with one or more gaming machines over a network connection;

one or more processors, wherein the one or more processors are communicatively connected with the communications interface and one or more storage devices, wherein secondary applications are stored on the one or more storage devices, wherein the secondary applications are secondary to any wager gaming routines provided by a first gaming machine of the one or more gaming machines, wherein the secondary applications are configured to provide information including information ancillary to any of the wager gaming routines provided by the first gaming machine, and wherein the secondary applications are player-selectable from a plurality of different types of secondary applications, and wherein the one or more processors are configured to:

receive a request for one or more player-selected ones of the secondary applications to be transmitted to the first gaming machine over the network, identify the one or more player-selected ones of the secondary applications stored on the one or more storage devices, and cause the one or more player-selected ones of the secondary applications to be transmitted to the first gaming machine.

2. The casino gaming server of claim 1, wherein the request is received from the first gaming machine.

3. The casino gaming server of claim 2, wherein the one or more processors are further configured to:

store selection data, wherein the selection data identifies the one or more player-selected ones of the secondary applications in the request, associate the selection data with a player associated with the request, receive a notification that the player is using a second gaming machine in the plurality of gaming machines, retrieve the selection data associated with the player in response to receiving the notification, and cause the one or more player-selected ones of the secondary applications identified in the selection data to be transmitted to the second gaming machine.

4. The casino gaming server of claim 1, wherein the request is received from a casino operator terminal.

5. The casino gaming server of claim 4, wherein the request includes a further request for the one or more player-selected ones of the secondary applications to be transmitted to one or more gaming machines in the plurality of gaming machines in addition to the first gaming machine, and wherein the one or more processors are further configured to cause the one or more player-selected ones of the secondary applications in the request to be transmitted to the one or more gaming machines in the plurality of gaming machines in addition to the first gaming machine.

6. The casino gaming server of claim 1, wherein the network connection includes a connection over the Internet.

7. A casino gaming system comprising:
- a first gaming machine, the first gaming machine comprising:
  - a first communications interface, wherein the first communications interface is configured to provide communications with a server over a network connection,
  - a first memory, and
  - a first gaming controller, wherein the first gaming controller is communicatively connected with the first memory and the first communications interface, and wherein the first gaming controller is configured to:
    - provide a first wager gaming routine,
    - receive one or more player-selected secondary applications transmitted via the first communications interface, wherein the one or more player-selected secondary applications are secondary to the first wager gaming routine and any and all wager gaming routines provided by the first gaming machine, wherein the one or more player-selected secondary applications are configured to provide information including information ancillary to the first wager gaming routine and any and all wager gaming routines provided by the first gaming machine, and wherein the one or more player-selected secondary applications may be selected from a plurality of different types of player-selectable secondary applications, and
    - store the one or more player-selected secondary applications in the first memory; and
- the server, the server comprising:
  - one or more processors, wherein the one or more processors are configured to communicate with one or more storage devices, wherein the one or more player-selected secondary applications are stored on the one or more storage devices, and
  - a server communications interface, wherein the server communications interface is configured to provide communications with the first gaming machine over the network connection,
  - wherein the one or more processors are further configured to:
    - receive a request via the network connection for the one or more player-selected secondary applications to be transmitted to the first gaming machine,
    - identify the one or more player-selected secondary applications on the one or more storage devices, and
    - cause the one or more player-selected secondary applications to be transmitted to the first gaming machine.

8. The casino gaming system of claim 7, further comprising:
- a second gaming machine, the second gaming machine comprising:
  - a second communications interface, wherein the second communications interface is configured to provide communications with the server over the network connection,
  - a second memory, and
  - a second gaming controller, wherein the second gaming controller is communicatively connected with the second memory and the second communications interface, and wherein the second gaming controller is configured to:
    - obtain player identification data from a player,
    - transmit the player identification data to the server,
    - receive the one or more player-selected secondary applications via the second communications interface, and
    - store the one or more player-selected secondary applications to the second memory;
- wherein the first gaming controller is further configured to:
  - obtain the player identification data from the player, and
  - transmit the player identification data to the server; and
- wherein the server is further configured to:
  - store selection data, wherein the selection data identifies the one or more player-selected secondary applications in the request,
  - associate the selection data with the player identification data,
  - receive a notification that the player is using the second gaming machine, wherein the notification includes the player identification data,
  - retrieve the selection data associated with the player identification data in response to receiving the notification, and
  - cause the one or more player-selected secondary applications identified in the selection data to be transmitted to the second gaming machine.

9. The casino gaming system of claim 7, wherein the request is received from a casino operator terminal.

10. The casino gaming system of claim 9, wherein the request includes a further request for the one or more player-selected secondary applications to be transmitted to one or more gaming machines in addition to the first gaming machine, and wherein the one or more processors are further configured to cause the one or more player-selected secondary applications in the request to be transmitted to the one or more gaming machines in addition to the first gaming machine.

11. The casino gaming system of claim 7, wherein the network connection includes a connection over the Internet.

12. A non-transitory, machine-readable medium storing computer program instructions operable to cause at least one computing device to:
- communicate with a first gaming machine over a network connection;
- receive a request for one or more player-selected secondary applications to be loaded to the first gaming machine over the network connection, wherein the one or more player-selected secondary applications are secondary to any wager gaming routines provided by the first gaming machine, wherein the one or more player-selected secondary applications are configured to provide information including information ancillary to any of the wager gaming routines and wherein the one or more player-selected secondary applications may be selected from a plurality of different types of player-selectable secondary applications;
- identify the one or more player-selected secondary applications on a storage device; and
- cause the one or more player-selected secondary applications to be transmitted to the first gaming machine.

13. The non-transitory, machine-readable medium of claim 12, wherein the request is received from the first gaming machine.

14. The non-transitory, machine-readable medium of claim 12, wherein the computer program instructions are further operable to cause the at least one computing device to:

store selection data, wherein the selection data identifies the one or more player-selected secondary applications in the request, associate the selection data with a player associated with the request, receive a notification that the player is using a second gaming machine, retrieve the selection data associated with the player in response to receiving the notification, and cause the one or more player-selected secondary applications identified in the selection data to be transmitted to the second gaming machine.

15. The non-transitory, machine-readable medium of claim 12, wherein the request is received from a casino operator terminal.

16. The non-transitory, machine-readable medium of claim 12, wherein the request includes a further request for the one or more player-selected secondary applications to be transmitted to one or more gaming machines in addition to the first gaming machine, and wherein the computer program instructions are further operable to cause the at least one computing device to cause the one or more player-selected secondary applications in the request to be transmitted to the one or more gaming machines in addition to the first gaming machine.

17. The non-transitory, machine-readable medium of claim 12, wherein the network connection includes a connection over the Internet.

18. A gaming method for facilitating game play via a gaming apparatus, the gaming apparatus comprising a controller and a first display unit, the controller communicatively coupled to the first display unit, the method comprising:

executing a wagering game software application for a game to be played by a player on the gaming apparatus;

causing the first display unit to display a game image for the wagering game on a first display;

executing a secondary software application for the gaming apparatus when the wagering game software application is being executed for the gaming apparatus, wherein the secondary software application is secondary to any wagering game software applications being executed by the gaming apparatus, wherein the secondary software application is designed to provide information including information ancillary to any of the wagering game software applications being executed by the gaming apparatus, the secondary software application being selected by the player to be provided on the gaming apparatus from a plurality of different types of secondary software applications;

displaying, before, during, and after an event occurs that the secondary software application detects, and when the secondary software application is being executed for the gaming apparatus simultaneously with the wagering game software application being executed for the gaming apparatus, an icon for the secondary software application simultaneously with the display of the game image on the first display, wherein a foreground of the game image is substantially unobstructed by the icon, and the icon is substantially unobstructed by the foreground of the game image, wherein the ancillary information is available only when the icon for the secondary software application is displayed, and wherein the ancillary information can be effectively requested by the player via the icon;

receiving information request data indicative of a request made by the player for the ancillary information via the icon when the wagering game software application is being executed;

obtaining first ancillary information using the secondary software application based on the information request data after the information request data has been received; and conveying the first ancillary information on the first display using the secondary software application when the wagering game software application is being executed for the wagering game being played on the gaming apparatus.

19. The gaming method as defined in claim 18, wherein displaying the icon comprises causing the first display unit to display the icon.

20. The gaming method as defined in claim 18, wherein the gaming apparatus comprises a second display unit separate from the first display unit, the second display unit communicatively coupled to the controller, wherein displaying the icon comprises causing the second display unit to display the icon.

21. The gaming method as defined in claim 18, wherein conveying information comprises changing an appearance of the icon.

22. The gaming method as defined in claim 21, wherein changing the appearance of the icon comprises at least one of flashing the icon off and on, changing a size of the icon, changing a color of the icon, and animating the icon.

23. The gaming method as defined in claim 18, wherein conveying information comprises displaying a window.

24. The gaming method as defined in claim 23, wherein displaying the window comprises causing the first display unit to display the window.

25. The gaming method as defined in claim 23, wherein the gaming apparatus comprises a second display unit separate from the first display unit, the second display unit communicatively coupled to the controller, wherein displaying the window comprises causing the second display unit to display the window.

26. The gaming method as defined in claim 18, wherein the gaming apparatus comprises a speaker operatively coupled to the controller, wherein conveying information comprises causing the speaker to generate sound.

27. The gaming method as defined in claim 18, further comprising loading the secondary software application to the controller.

28. The gaming method as defined in claim 27, wherein loading the secondary software application to the controller comprises loading the secondary software application from a network operatively coupled to the gaming apparatus.

29. The gaming method as defined in claim 27, wherein loading the secondary software application to the controller comprises loading the secondary software application from a portable memory device operatively coupled to the gaming apparatus.

30. The gaming method as defined in claim 27, further comprising:

prompting a person to select the secondary software application from a plurality of possible secondary software applications;

receiving selection data; and loading the secondary software application in response to the selection.

31. The gaming method as defined in claim 18, further comprising displaying a toolbar simultaneous with the display of the game image, wherein the foreground of the game image is substantially unobstructed by the toolbar, wherein the toolbar is substantially unobstructed by the foreground of the game image, and wherein displaying the icon for the secondary software application comprises displaying the icon within the toolbar.

32. The gaming method as defined in claim 18, further comprising using the secondary software application to provide a bonus condition associated with the wagering game software application.

33. The gaming method as defined in claim 18, wherein the controller is communicatively coupled to a network, the gaming method further comprising receiving the information conveyed by the secondary software application via the network.

34. The gaming method as defined in claim 18, further comprising interpreting instructions of the secondary software application using an interpreter.

35. The gaming method as defined in claim 18, further comprising compiling instructions of the secondary software application using a just-in-time compiler.

36. The gaming method as defined in claim 18, wherein the secondary software application interacts with the wagering game software application to detect the event.

37. The gaming method as defined in claim 18, wherein conveying information occurs in response to the secondary software application detecting the event.

38. A gaming apparatus, comprising:

a first display unit;

a value input device; and a controller operatively coupled to the first display unit and the value input device, the controller comprising a processor and a memory operatively coupled to the processor, the controller being programmed to execute a wagering game software application for a wagering game to be played by a player on the gaming apparatus, the controller being programmed to cause the first display unit to display a game image for the wagering game on a first display, the controller being programmed to execute a secondary software application for the gaming apparatus when the wagering game software application is being executed for the gaming apparatus, wherein:

the secondary software application is secondary to any wagering game software applications being executed by the gaming apparatus;

the secondary software application is designed to provide information including information ancillary to any of the wagering game software applications being executed by the gaming apparatus;

the secondary software application is selected by the player to be provided on the gaming apparatus from a plurality of different types of secondary software applications;

the controller being programmed to cause, when the secondary software application is being executed for the gaming apparatus simultaneously with the wagering game software application being executed for the gaming apparatus, an icon for the secondary software application to be displayed before, during, and after an event occurs that the secondary software application detects and simultaneously with the game image on the first display;

a foreground of the game image is substantially unobstructed by the icon, and the icon is substantially unobstructed by the foreground of the game image;

the ancillary information is available only when the icon for the secondary software application is displayed; and the ancillary information can be effectively requested by the player via the icon, the controller being programmed to receive information request data indicative of a request made by the player for the ancillary information via the icon when the wagering game software application is being executed, the controller being programmed to obtain first ancillary information using the secondary software application based on the information request data after the information request data has been received, and the controller being programmed to convey the first ancillary information on the first display using the secondary software application when the wagering game software application is being executed for the wagering game being played on the gaming apparatus.

39. The gaming apparatus as defined in claim 38, wherein the controller is programmed to cause the first display unit to display the icon.

40. The gaming apparatus as defined in claim 38, further comprising a second display unit separate from the first display unit, the second display unit communicatively coupled to the controller, wherein the controller is programmed to cause the second display unit to display the icon.

41. The gaming apparatus as defined in claim 38, wherein the controller is programmed to change an appearance of the icon.

42. The gaming apparatus as defined in claim 38, wherein the controller is programmed to cause a window to be displayed to convey the information.

43. The gaming apparatus as defined in claim 38, further comprising a speaker operatively coupled to the controller, wherein the controller is programmed to cause the speaker to generate sound to convey information.

44. The gaming apparatus as defined in claim 38, wherein the controller is communicatively coupled to a network, wherein the controller is programmed to receive the secondary software application via the network.

45. The gaming apparatus as defined in claim 38, further comprising a portable memory device reader operatively coupled to the controller, wherein the controller is programmed to receive the secondary software application from a portable memory device via the portable memory device reader.

46. The gaming apparatus as defined in claim 38, wherein the controller is programmed to implement an interpreter to interpret instructions of the secondary software application.

47. The gaming apparatus as defined in claim 38, wherein the controller is programmed to convey information in response to the secondary software application detecting the event.

* * * * *